United States Patent
Chiari

(10) Patent No.: US 10,208,225 B2
(45) Date of Patent: Feb. 19, 2019

(54) FLUORO COPOLYMERS, IMMOBILIZATION OF BIOMOLECULES, AND MICROARRAYS

(71) Applicant: Marcella Chiari, Milan (IT)

(72) Inventor: Marcella Chiari, Milan (IT)

( * ) Notice: Subject to any disclaimer, the term of this patent is extended or adjusted under 35 U.S.C. 154(b) by 109 days.

(21) Appl. No.: 15/017,747

(22) Filed: Feb. 8, 2016

(65) Prior Publication Data

US 2016/0228842 A1 Aug. 11, 2016

Related U.S. Application Data

(60) Provisional application No. 62/114,486, filed on Feb. 10, 2015.

(51) Int. Cl.
*C09D 133/24* (2006.01)
*C08F 220/54* (2006.01)

(52) U.S. Cl.
CPC .......... *C09D 133/24* (2013.01); *C08F 220/54* (2013.01); *B01J 2219/00596* (2013.01); *B01J 2219/00637* (2013.01); *B01J 2219/00722* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,433,111 A * | 2/1984 | Tighe | ........................ | C08F 8/20 351/159.33 |
| 5,010,141 A * | 4/1991 | Mueller | ..................... | C08F 8/30 525/276 |
| 5,086,138 A | 2/1992 | Bowen et al. | | |
| 5,210,248 A * | 5/1993 | Babirad | ................ | C07F 7/1804 556/420 |
| 5,219,965 A | 6/1993 | Valint et al. | | |
| 5,739,236 A | 4/1998 | Bowers et al. | | |
| 6,262,208 B1 * | 7/2001 | Makabe | ................ | C08F 226/06 351/159.33 |
| 7,244,443 B2 * | 7/2007 | Pacetti | .................... | A61L 31/10 424/423 |
| 7,939,579 B1 * | 5/2011 | Tapper | ................. | C08F 220/56 523/107 |
| 8,809,071 B2 | 8/2014 | Chiari | | |
| 2002/0107337 A1 * | 8/2002 | Rosenzweig | ......... | C08F 220/56 525/474 |
| 2005/0234205 A1 * | 10/2005 | Yamaguchi | ........... | C08F 220/22 526/242 |
| 2013/0115382 A1 | 5/2013 | Chiari | | |
| 2014/0303281 A1 * | 10/2014 | Mackulin | ............. | C08F 220/18 523/205 |

FOREIGN PATENT DOCUMENTS

| | | |
|---|---|---|
| CN | 1061785 | 6/1992 |
| CN | 103694416 A * | 4/2014 |
| EP | 1 567 569 B1 | 8/2005 |
| WO | WO 2011/124715 | 10/2011 |

OTHER PUBLICATIONS

Machine translation of CN 103694416 A, retrieved Sep. 2018 (Year: 2018).*
Allcock, *Contemporary Polymer Chemistry*, Allcock and Lamp, Prentice Hall, 1981 (Title page and table of contents).
R.P. Auburn et al., Robotic spotting of cDNA and oligonucleotide microarrays, *Trends Biotechnol.* 23 (2005) 374-379.
S. Battistella et al., Genotyping β-globin gene mutations on copolymer-coated glass slides with the ligation detection reaction, *Clin. Chem.* 54 (2008) 1657-1663.
*Textbook of Polymer Science*, 3rd Ed., Billmeyer, Wiley-Interscience, 1984.
Brown et al., "Exploring the new world of the genome with DNA microarrays", *Nature Genetics Supplement*, vol. 21, 1999, pp. 33-37.
N.J. Cira et al., Vapour-mediated sensing and motility in two-component droplets, *Nature.* 519 (2015) 446-450.
M. Cretich et al., Functionalization of Poly(dimethylsiloxane) by Chemisorption of Copolymers: DNA Microarrays for Pathogen Detection, *Sens. and Actuat., B-Chem.*, 2008, 132, 258-264.
M. Cretich et al., Interferometric silicon biochips for label and label-free DNA and protein microarrays, *Proteomics.* 12 (2012) 2963-2977.
M. Cretich et al., Overcoming mass transport limitations to achieve femtomolar detection limits on silicon protein microarrays, *Anal. Biochem.* 418 (2011) 164-166.
M. Cretich et al., Coating of nitrocellulose for colorimetric DNA microarrays, *Anal. Biochem.* 397 (2010) 84-88.
M. Cretich et al., High sensitivity protein assays on microarray silicon slides, *Anal. Chem.* 81 (2009) 5197-5203.
M. Cretich et al., Allergen microarrays on high-sensitivity silicon slides., *Anal. Bioanal. Chem.* 398 (2010) 1723-33.
M. Cretich et al., A new polymeric coating for protein microarrays, *Anal. Bioanal. Chem.* 332 (2004) 67-74.
M. Cretich et al., Silicon biochips for dual label-free and fluorescence detection: Application to protein microarray development, *Biosensors and Bioelectronics* 26 (2011) 3938-3943.
Chiari et al, "Peptide microarrays for the characterization of antigenic regions of Human chromogranin A", *Proteomics* 2005, 5, 3600-3603.
G.H. Cross et al., A new quantitative optical biosensor for protein characterisation, *Biosens. Bioelectron.* 19 (2003) 383-390.

(Continued)

*Primary Examiner* — Nicole M. Buie-Hatcher
(74) *Attorney, Agent, or Firm* — The Marbury Law Group, PLLC

(57) ABSTRACT

Novel copolymers provide for improved microarray performance. The copolymers are based on acrylamide, acrylate, and/or methacrylate monomer repeat units and include specific, functional monomers including a fluorinated monomer to control surface hydrophilicity such as increase water contact angle and reduce spot size when the copolymer is used in thin film form on a microarray substrate. The copolymers are prepared by free-radical polymerization and are random in nature.

17 Claims, 6 Drawing Sheets

(56) References Cited

OTHER PUBLICATIONS

S. Galbiati et al., A new microarray substrate for ultra-sensitive genotyping of KRAS and BRAF gene variants in colorectal cancer., *PLoS One.*8 (2013) e59939.
S. Galbiati,et al., Development of new substrates for high-sensitive genotyping of minority mutated alleles, *Electrophoresis.*29 (2008) 4714-4722.
G.C. Le Goff et al., Shrinking hydrogel-DNA spots generates 3D microdots arrays., *Macromol. Biosci.* 13 (2013) 227-33. doi:10.1002/mabi.201200370.
M. Hartmann et al., Protein microarrays for diagnostic assays, *Anal. Bioanal. Chem.* 393 (2009) 1407-1416.
H.Y. Kim et al., Characterization and simulation of cDNA microarray spots using a novel mathematical model., *BMC Bioinformatics.*8 (2007) 485.
Kohane et al., *Microarrays for an Integrative Genomics*, MIT Press, 2003 (Title page and Table of Contents).
V. Kumar et al., Fluorocarbon coatings via plasma enhanced chemical vapor deposition of 1H,1H,2H,2H-perfluorodecyl acrylate-1, spectroscopic characterization by FT-IR and XPS, *Plasma Process. Polym.* 7 (2010) 939-950.
S.L. Lai et al., Enhancing the fluorescence intensity of DNA microarrays by using cationic surfactants., *Langmuir.*27 (2011) 5659-64.
M. Lee et al., Fabrication of a hydrophobic/hydrophilic hybrid-patterned microarray chip and its application to a cancer marker immunoassay, *Biochip J.* 6 (2012) 10-16.
M. Mammen et al., Effective Inhibitors of Hemagglutination by Influenza Virus Synthesized from Polymers Having Active Ester Groups. Insight into Mechanism of Inhibition, *J. Med. Chem.* 38 (1995) 4179-4190.
M. Meli et al., Dynamic diagnosis of familial prion diseases supports the $\beta 2$-$\alpha 2$ loop as a universal interference target, *PLoS One.*6 (2011) e19093.
J.M. Moran-Mirabal, Controlling microarray spot morphology with polymer liftoff arrays, *Anal. Chem.* 79 (2007) 1109-1114.
Mueller et al., , Microarrays, Elsevier, 2006 (Title page and table of contents).
D. Petti et al., Functionalization of gold surfaces with copoly(DMA-NAS-MAPS) by dip coating: Surface characterization and hybridization tests, *Sensors Actuators, B Chem.* 190 (2014) 234-242.
Pirri et al., Characterization of a Polymeric Adsorbed Coating for DNA Microarray Glass Slides, *Anal. Chem.* 76 (2004) 1352-1358.
C.C. Pritchard et al., , Colorectal cancer molecular biology moves into clinical practice, *Gut.* 60 (2011) 116-129.
D.S. Rickman et al., Optimizing spotting solutions for increased reproducibility of cDNA microarrays., *Nucleic Acids Res.* 31 (2003) e109.
W. Senaratne et al., Self-assembled monolayers and polymer brushes in biotechnology: current applications and future perspectives., *Biomacromolecules.* 6 (2005) 2427-2448.
S. Stenirri et al., Denaturing HPLC profiling of the ABCA4 gene for reliable detection of allelic variations., *Clin. Chem.* 50 (2004) 1336-43.
Song et al., Carbohydrate arrays: recent developments in fabrication and detection methods with applications, Current Opinion in Chemical Biology 2009, 13:626-632.
R. Suriano et al., Surface behavior and molecular recognition in DNA microarrays from N,N-dimethylacrylamide terpolymers with activated esters as linking groups., *Macromol. Biosci.* 6 (2006) 719-29.
M.J. Swann et al., , Dual-polarization interferometry: an analytical technique to measure changes in protein structure in real time, to determine the stoichiometry of binding events, and to differentiate between specific and nonspecific interactions., *Anal. Biochem.* 329 (2004) 190-8.
C. Zilio et al., Universal hydrophilic coating of thermoplastic polymers currently used in microfluidics, *Biomed. Microdevices.* 16 (2014) 107-114.

\* cited by examiner

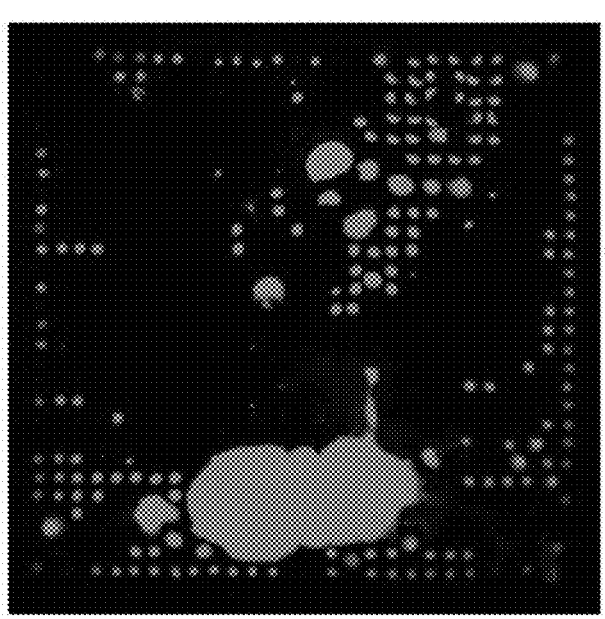
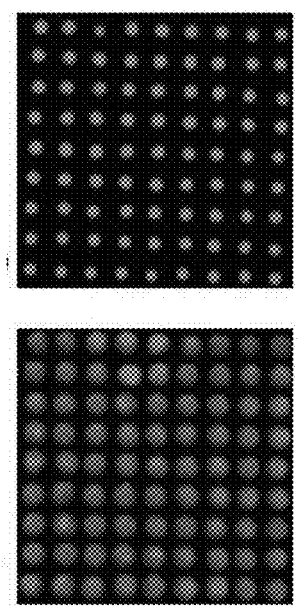
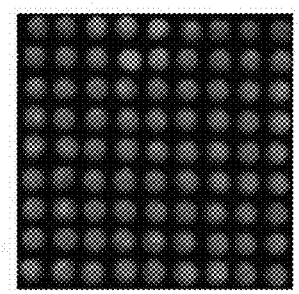
FIG. 4A
FIG 4B
FIG. 4C

FIG. 6A
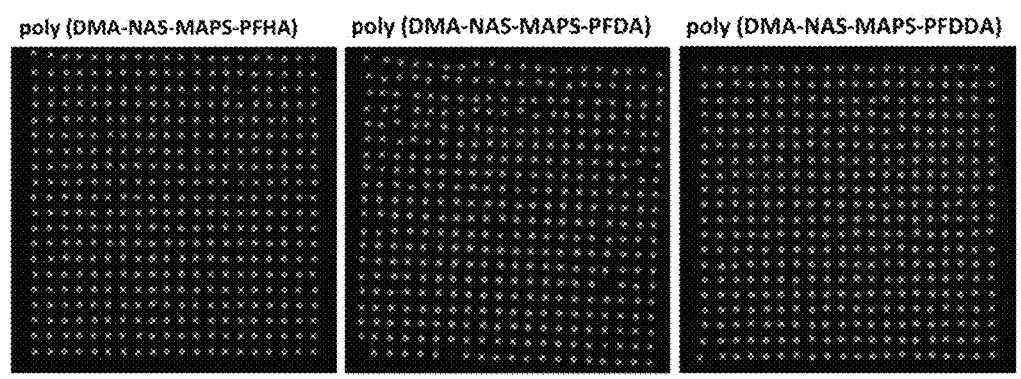
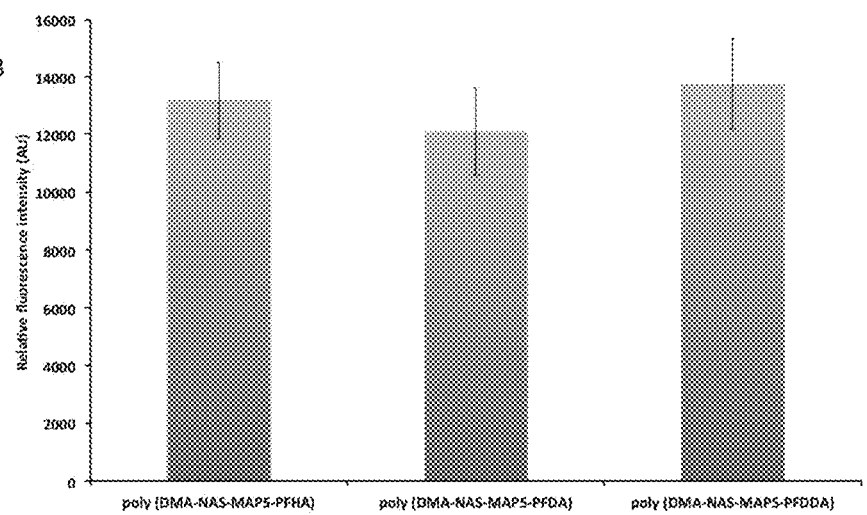
FIG. 6B

FLUORO COPOLYMERS, IMMOBILIZATION OF BIOMOLECULES, AND MICROARRAYS

RELATED APPLICATIONS

This application claims priority to U.S. provisional application 62/114,486 filed Feb. 10, 2015 which is hereby incorporated by reference in its entirety.

BACKGROUND

In recent years, the microarray technology has emerged as an important technique with wide applications in different areas of biomedical analysis thanks to its versatility and miniaturization capability. In order to accomplish a large number of genomic or proteomic tests in parallel, a microarray substrate is functionalized with thousands of probes bound to a solid surface in pico or femto moles ($10^{-12}$, $10^{-15}$ amounts. As a consequence, the physical and chemical characteristics of the interfacial layer between the biomolecules and the inorganic substrate are key factors for the success of the technique. In fact, proper biomolecule deposition and immobilization are crucial to increase the accuracy of data analysis as spot morphology has a great impact on the signal level: non homogeneous spots, such as doughnut-shape spots or coffee ring effect may cause errors in the acquisition and measurement of signals, thus affecting the reliability of the assay [1]. Furthermore, advances on micro fabrication techniques have led to the development of miniaturized and fully integrated solid phase analytical devices that imply a scaling down of the entire analytical system and process while maintaining high sensitivity. The miniaturization of the system requires excellent control of the surface properties in order to maximize probe immobilization in reduced areas, avoiding spot merging and cross contamination.

Several strategies have been adopted to control spot morphology and merging. In particular, considering the drying rate of a diluted droplet placed on a surface, hybrid hydrophobic/hydrophilic substrates have been introduced: Moran-Mirabal and collaborators have solved the problem of coffee ring effect by fabricating a polymer liftoff surface which combines a hydrophobic polymer film of PARYLENE, (chemically vapour deposited poly(pxylylene) polymer) with photolithographically patterned hydrophilic areas of a Self Assembled Monolayer (SAM), where the DNA is deposited. The part of the drop in contact with the hydrophobic area undergoes, through evaporation, an inward capillary flow which reduces the coffee stain effect [2]. Similarly, Lee and collaborators introduced a hybrid substrate constituted of two different types of SAMs one hydrophobic and one hydrophilic, obtained, similarly, through photolithography [3]. Even though these approaches solve the issue of irregular spots and cross-contamination, facilitating the assay analysis, they are very complicated to perform and involve the use of SAMs which show several drawbacks such as thermal instability, limited range of functional groups displayed on the surface, long reaction times to obtain monolayers [4]. Furthermore, the two-dimensional arrangement of SAM restricts the maximal surface density of the functional moieties and provide limited accessibility of functionalities [5]. Three-dimensional surfaces, instead, provide a homogenous surface presenting high concentration of reactive groups, resulting in an increased binding capacity of targets compared to monodimensional films [5]. Ultimately, they act as linkers distributing the bound probe also in the axial position, thus causing a faster reaction with the target involved in biomolecular recognition. Recently, a 3D-hydrogel was presented as a method to immobilize DNA, in order to increase probe density [6]. The hydrogel is photopolymerized onto a particular support, called PolyShrink, a thermosensitive material, which offers the possibility of reducing the array dimensions by heating the surface. As a consequence, also the height of the spot increases (up to 6 µm), promoting hybridization, but the immobilization procedure is quite complicated as it consists in the deposition of a mixture of a pre-synthesized polymer together with the oligonucleotides, which are then photopolymerized; the entire array is then cured at 160° C. to shrink the surface, a temperature which is not compatible with several biological systems.

In 2004, Pirri and collaborators [7] proposed a polymer coating realized by a combination of physisorption and chemisorption that promotes the attachment of biomolecules by exposing functionalities such as active esters reactive towards the nucleophile groups of proteins, peptides or amino-modified DNA. In particular, this copolymer, poly (DMA-NAS-MAPS), is constituted of three monomers: N, N-dimethylacrylamide (DMA) that binds to the surface by weak non-covalent interactions such as hydrogen bonding, Van der Waals or hydrophobic forces, N-acryloyloxysuccinimmide (NAS) a chemically reactive monomer that covalently binds DNA and proteins to the surface, and a pending silane hydrolyzable monomer, 3-(trimethoxysilyl) propyl methacrylate (MAPS), which promotes the condensation of the polymer with surface silanols. The coating is obtained by simply immersing the support (glass [7], silicon oxide [8] [9], nitrocellulose [10], gold [11], plastics [12]) in a diluted aqueous solution of the polymer. Beside the simplicity of its use, another peculiar characteristics of this coating is its hydrophilicity, which results in high resistance to nonspecific binding and low background signal [12].

Unfortunately, the hydrophilicity of a surface has important consequences on the process of deposition of liquid droplets. When the distance between spots must be kept low to increase spot density, it is important to control how the liquid spreads out over the surface as well as the size of the spot. This latter parameter is related to the hydrophobicity of the surface as measured by the contact angle. A low contact angle (<45°) indicates a hydrophilic surface with good wetting properties on which water readily spreads and sticks. A high contact angle (>90°) denotes a hydrophobic surface where water does not interact forming droplets that do not stick to the surface but are easily displaced. A desirable coating must prevent excessive spreading of the droplets to concentrate the probe in small areas. However, a firm attachment to the underlying surface is also needed so that the droplets remain in position on the surface and dry-out to produce a spot with a reproducible size and uniform intensity. In some circumstances, the poly(DMA-NAS-MAPS) coating provides a surface which is too hydrophilic to allow the creation of an array of small sizes with reduced spot-to-spot distance: reduced spotting areas are, in fact, typical in miniaturized biosensors, microfluidic devices, and LoC (Lab on a Chip).

Additional background is provided in priority U.S. provisional application 62/114,486 filed Feb. 10, 2015, which is incorporated herein by reference, including reference to the following technical documents: EP Patent 1 567 569 B1; U.S. Pat. No. 8,809,071; Cretich M. et al., Functionalization of Poly(dimethylsiloxane) by Chemisorption of Copolymers: DNA Microarrays for Pathogen Detection, *Sens. and*

*Actuat. B-Chem.,* 2008, 132, 258-264; and Brown and Botstein, *Nature Genetics Supplement* Vol 21, 1999, pp. 33-37.

Hence, despite advances in the art, a need yet exists for better polymer structures which can be used, for example, in thin, nanoscale layers for biomolecular binding and molecular surface assays, including high density microarrays.

SUMMARY

Embodiments described herein include compounds, polymers, compositions, devises, kits, and systems, as well as methods of making and methods of using same.

One embodiment, for example, provides for a composition comprising: at least one copolymer comprising at least the following repeat units: (A) at least one surface interacting monomer repeat unit, (B) at least one monomer repeat unit bearing a chemically active group, (C) optionally, at least one silane monomer repeat unit, and (D) at least one fluorinated monomer repeat unit, wherein monomer repeat units A, B, optional C, and D are different from each other. In one embodiment, the optional silane monomer repeat unit C is present.

In one embodiment, the copolymer has a backbone which is an all carbon backbone.

In one embodiment, the monomer repeat units A, B, optional C, and D are an N-substituted acrylamide, an N-substituted methacrylamide, an acrylate, or a methacrylate monomer repeat unit. As used herein, N-substituted acrylamide and N-substituted methacrylamide includes where one or both of the —NH groups are substituted to form, for example, —N-alkyl such as —N-methyl. Preferably, both —NH groups are substituted.

In one embodiment, the copolymer consists essentially of the monomer repeat units A, B, optional C, and D. In another embodiment, the copolymer consists of the monomer repeat units A, B, optional C, and D.

In one embodiment, the copolymer is a random copolymer.

In one embodiment, the copolymer is a random copolymer represented by:

-[A]$_m$-[B]$_n$-[C]$_p$-[D]$_q$- wherein A, B, optional C, and D are the monomer repeat units of claim 1, and the values of m, n, p, and q determine the percent molar amounts of the repeat units of A, B, optional C, and D, respectively in the copolymer. One embodiment provides that m+n+p+q=100 and m is 93-97, n is 1-3, p is 0-3, and q is 1-5.

In one embodiment, the fluorinated monomer repeat unit D is an acrylate, a methacrylate, an N-substituted acrylamide, or a methacrylamide monomer repeat unit. In one embodiment, the fluorinated monomer repeat unit D is an acrylate or an N-substituted acrylamide repeat unit.

In one embodiment, the fluorinated monomer repeat unit D is represented by:

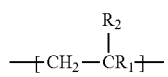

wherein $R_1$ is methyl or H, and $R_2$ is a fluorinated group.
In one embodiment, the fluorinated monomer repeat unit D is represented by:

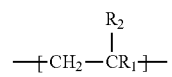

wherein $R_1$ is methyl or H, and $R_2$ is a $C_1$-$C_{25}$ fluorinated group.

In one embodiment, the fluorinated monomer repeat unit D is represented by:

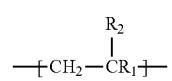

wherein $R_1$ is methyl or H, and $R_2$ is a $C_6$-$C_{15}$ fluorinated group.

In one embodiment, the fluorinated monomer repeat unit D is represented by:

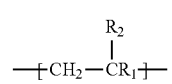

wherein $R_1$ is H or —$CH_3$, and $R_2$ is —C(O)O—$R_3$ or —C(O)NH—$R_3$, wherein $R_3$ is a monovalent $C_1$-$C_{15}$ fluorinated group having a terminal $CF_3$ group and at least one —$CF_2$-group.

In one embodiment, the fluorinated monomer repeat unit D is represented by:

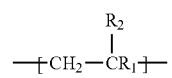

wherein $R_1$ is H or —$CH_3$, and $R_2$ is —C(O)O—$R_3$ or —C(O)NH—$R_3$, wherein $R_3$ a monovalent $C_1$-$C_{15}$ fluorinated group having a terminal $CF_3$ group and at least five —$CF_2$-groups.

In one embodiment, the fluorinated monomer repeat unit D is represented by:

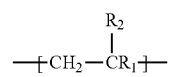

wherein $R_1$ is H, and $R_2$ is —C(O)O—$R_3$, wherein $R_3$ a monovalent $C_6$-$C_{15}$ fluorinated group having a terminal $CF_3$ group and at least five —$CF_2$-groups and at least one —$CF_2$-group.

In one embodiment, the surface interacting monomer repeat unit A is a polymerized form of monomer selected from the group of (i) acrylamide, (ii) methacrylamide, wherein the acrylamide (i) or the methacrylamide (ii) are independently mono- or di-substituted on the nitrogen by $C_1$ to $C_{12}$ linear or branched alkyl, halo-substituted $C_1$ to $C_{12}$ alkyl, methoxy-substituted C1 to $C_{12}$ alkyl or hydroxyl-substituted $C_1$ to $C_{12}$ alkyl, and (iii) vinylpyrrolidone.

As used herein, a "polymerized form" of a monomer or a compound indicates that the polymerizable group in the monomer or compound has been polymerized as known in the art. For example, a vinyl group in a monomer $CH_2$=CHR can be converted to a bivalent —[$CH_2$—CHR]- moiety of an oligomer or polymer, as known in the art.

In one embodiment, the surface interacting monomer repeat unit A is represented by:

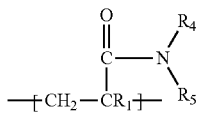

wherein $R_1$ is H or methyl, and $R_4$ and $R_5$ are independently optionally substituted alkyl groups.

In one embodiment, the surface interacting monomer repeat unit A is a polymerized form of monomer dimethylacrylamide or diethylacrylamide, preferably dimethylacrylamide.

In one embodiment, for the monomer repeat unit bearing a chemically active group, B, the chemically active group is selected from the group of thiols, primary amines, secondary amines, tertiary amines, quaternary ammoniums, phosphines, alcohols, carboxylic acids, vinylsulfonyls, aldehydes, epoxides, hydrazides, succinimidyl esters, carbodiimides, maleimides, iodoacetyls, isocyanates, isothiocyanates, aziridines, sulfonates or halides.

In one embodiment, for the monomer repeat unit bearing a chemically active group, B, the chemically active group is a succinimidyl ester.

In one embodiment, the monomer repeat unit bearing a chemically reactive group, B, is represented by:

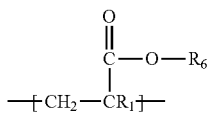

wherein $R_1$ is H or methyl and $R_6$ is a group providing the chemically reactive group including optionally a nitrogen atom.

In one embodiment, the monomer repeat unit bearing a chemically active group, B, is a polymerized form of glycidyl methacrylate or N-acryloyloxysuuccinimide.

In one embodiment, the silane monomer repeat unit C is present and is represented by:

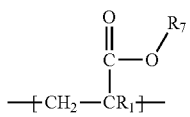

wherein $R_1$ is H or methyl and $R_7$ comprises a silane moiety.

In one embodiment, the silane monomer repeat unit C is present and is selected from the group of a polymerized form of a monomer which is an alkoxy silane monomer or an acyloxy silane monomer.

In one embodiment, the silane monomer repeat unit C is present and is represented by the formula: $RSiR'_n Y_{3-n}$ wherein R is a polymerized form of an ethylenically unsaturated hydrocarbyl, hydrocarbyloxy or (meth)acryloxyhydrocarbyl group; R' is an aliphatic saturated hydrocarbyl group, n is 0 or 1 or 2 and Y is a hydrolysable organic group.

In one embodiment, R is a polymerized form of vinyl, allyl, isopropenyl, butenyl, cyclohexenyl or gamma-(meth)acryloxypropyl and Y is methoxy, ethoxy, formyloxy, acetoxy, or propionyloxy.

In one embodiment, the silane monomer repeat unit C is present and is selected from the group of a polymerized form of vinyltrimethoxy silane, vinylbismethoxyethoxy silane, vinyltriethoxy silane, gamma-(meth)acryloxypropyltrimethoxy silane, gamma-(meth)-acryloxypropyltriethoxy silane and vinyltriacetoxy silane.

In one embodiment, the monomer repeat units A, B, and optional C contain no fluorine.

In one embodiment, the molar amounts of the monomer repeat units are: A) for monomer repeat unit A, 65% to 99%; B) for monomer repeat unit B, 0.1% to 10%; C) for monomer repeat unit C, 0% to 10%; D) for monomer repeat unit D, 0.1% to 15%. In another embodiment, the molar amounts of the repeat units are: A) for monomer repeat unit A, 90% to 99%; B) for monomer repeat unit B, 1% to 5%; C) for monomer repeat unit C, 0% to 5%; D) for monomer repeat unit D, 1% to 10%.

Another embodiment provides, for example, a copolymer consisting essentially of a backbone consisting essentially of N-substituted acrylamide, N-substituted methacrylamide, acrylate, or methacrylate repeat units, wherein the copolymer consists essentially of at least three repeat units different from each other, wherein at least one of the repeat units is an acrylamide repeat unit, at least one of the repeat units is adapted for covalently binding to a biological molecule, and at least one repeat unit is a fluorinated monomer repeat unit. In one embodiment, the copolymer further consists essentially of a silane repeat unit.

Still further, another embodiment provides a composition comprising the composition as described herein and at least one solvent for the copolymer. In one embodiment, the solvent is water. For example, in mixing with water, the copolymer can be in wet but solid or semi-solid form or in solution, liquid form. In one embodiment, the composition further comprises at least one salt. In one embodiment, the composition further comprises at least one ammonium salt or at least one sulfate salt. In one embodiment, the composition further comprises at least one salt in a concentration of 0.1 M to 0.5 M. In one embodiment, the composition further comprises at least one second copolymer different from the first.

Another embodiment is a device comprising the composition as described herein. In one embodiment, the device is a microarray device in which the composition as described herein is disposed as a film on a substrate. In one embodiment, the film has a film thickness of 1 nm to 100 nm. In more embodiments, the film provide a water contact angle of at least 40°, or the film provides a water contact angle of at least 50°. In one embodiment, the copolymer of the film is in reacted form having reacted with a biomolecule.

Another embodiment is a method for making the composition of claim 1 comprising copolymerizing: i) at least one monomer A' to provide monomer repeat unit A in the copolymer; ii) at least one monomer B' to provide monomer repeat unit B in the copolymer; iii) optionally, at least one monomer C' to provide monomer repeat unit C in the copolymer; and iv) at least one monomer D' to provide monomer repeat unit D in the copolymer.

Still further, another embodiment is binding the composition of the device as described herein to a biomolecule. In one embodiment, the device is a microarray characterized by a spot size pitch of less than 200 microns. In another embodiment, the device is a microarray characterized by a spot size pitch of less than 190 microns. In another embodiment, the device is a microarray characterized by a spot size pitch of less than 160 microns. In another embodiment, the device is a microarray characterized by a spot size pitch of 140 microns to 200 microns.

Another embodiment is a copolymer consisting essentially of a backbone consisting essentially of N-substituted acrylamide, N-substituted methacrylamide, acrylate, or methacrylate repeat units, wherein the copolymer consists essentially of at least three repeat units different from each other, wherein at least one of the repeat units is an N-substituted acrylamide repeat unit or an N-substituted methacrylamide repeat unit, at least one of the repeat units is adapted for covalently binding to a biological molecule, and at least one repeat unit is a fluorinated monomer repeat unit. In one embodiment, the copolymer further consists essentially of a silane repeat unit.

In preferred embodiments, to overcome problems in the prior art, a new coating is proposed that exemplifies the versatility of a copolymer system based on, in preferred embodiments, DMA and MAPS monomers. It shows how one can modulate the properties of the surface by modifying a component of the copolymer. Here, in preferred embodiments, a new copolymer is introduced which provides all the advantages of poly(DMA-NAS-MAPS) in terms of simplicity of coating production, high probe binding density, tridimensionality and low background signal, but, thanks to the presence of an additional hydrophobic monomer, forms a more hydrophobic coating able to control how the liquid spreads out over the surface as well as the size of the spot, thus the possibility of reducing the pitch between spots. The use of several fluorinated monomers has been explored in preferred embodiments, as minor component of the system, which impart to the surface low energy. The fluorinated monomers include, among others, preferred embodiments of 1H,1H-perfluoroheptyl acrylate (PFHA), 1H,1H,2H,2H-perfluorodecyl acrylate (PFDA), 1H,1H,2H,2H perfluorododecyl acrylate (PFDDA). The coating process is another main advantage of the preferred copolymers as they can be easily adsorbed onto, for example, glass or silicon oxide by simply immersing the substrates into a diluted aqueous solution of the polymer. The result is a microarray surface with intermediate hydrophobic/hydrophilic properties, which also allows a decrease of spot-to-spot distance without merging of the droplets, a very useful characteristic in those applications which imply the use of reduced areas, for example in miniaturized biosensors or microfluidic devices.

To further improve the spot morphology, the use of several detergents added to the spotting buffer has been investigated in preferred embodiments. Surfactants, in fact, are used as additives in spotting buffers as they decrease surface tension and change the evaporation rate of the drops onto the surface, thus improving the spot morphology, the hybridization process, and the overall assay performance. The fluorinated coating has been used for the genotyping of KRAS G12D mutation, a common variant in the KRAS gene implicated in the colorectal cancer, as an example of application in DNA microarray.

In sum, advantages of the claimed inventions, for at least some embodiments, include a new copolymer which provides advantages of copoly(DMA-MAPS-NAS) such as, for example, simplicity of coating production, high probe binding density, and three dimensionality, but in addition, due to the presence of an additional hydrophobic monomer, the copolymer forms a more hydrophobic coating and more versatile microarray production. The hydrophobicity can be "tuned." Additional advantages for at least some embodiments for the presently claimed inventions is a simple and fast method for immobilizing biological molecules such as peptides, proteins and nucleic acids onto the surface of glass or plastic materials commonly used as substrates for the adhesion of said molecules, such as microwell plates, beads, tubes, microscope slides, silicon wafers and membranes. The method of the presently claimed inventions, for at least some embodiments, exploits the ability of some copolymers of N-substituted polyacrylamides to be adsorbed onto the surface of the above mentioned materials, and, in some cases, once absorbed, to covalently react with the surface through appropriate functional groups, forming a coating with tunable hydrophilicity and accessible functionalities. The coating bears reactive groups able to covalently bind the biological molecules and biological ultrastructures of interest.

BRIEF DESCRIPTION OF FIGURES

FIGS. 4A-C show fluorescence image of an amino-modified oligonucleotide spotted on (A) poly(DMA-NAS-MAPS), (B) and (C) poly(DMA-NAS-MAPS-PFDA) coated silicon/silicon oxide slides, spotted using 0.01% of sucrose monolaurate as additive in the spotting buffer and analyzed after hybridization with the complementary Cy3 labeled oligonucleotide. Spot pitch is (A) and (B) 160 μm, and (C) 140 μm. Because of the hydrophilic characteristic of the poly(DMA-NAS-MAPS) coating, when spots are too close to each other they tend to merge, preventing the fabrication of an array in areas with limited dimensions. The arrays have been obtained using (A) and (B) 50 μm and (C) 80 μm nozzle; images were scanned using 22% of laser power and 64% of photomultiplier tube gain (PMT). (A) is a full scale image of a 20×20 array, while (B) and (C) are magnifications of 20×20 arrays.

FIGS. 6A-B. (A) Fluorescence images of an amino-modified oligonucleotide spotted on poly(DMA-NAS-MAPS-PFHA), poly(DMA-NAS-MAPS-PFDA) and poly (DMA-NAS-MAPS-PFDDA) coated silicon/silicon oxide slides, using 0.01% of sucrose monolaurate as additive in the spotting buffer and analyzed after hybridization with the complementary Cy3 labeled oligonucleotide. Spot pitch is 160 μm in the three arrays and a mean diameter of the spots is 70 μm (calculated averaging the diameters of the spots of each array); (B) Fluorescence intensity signals of the three arrays. Values are the average of fluorescence intensity of the spots of each array, constituted of 20×20 spots. The arrays are obtained using a 50 μm nozzle. Images are scanned using 22% of laser power and 64% of photomultiplier tube gain (PMT).

DETAILED DESCRIPTION

Introduction

Figure 1:
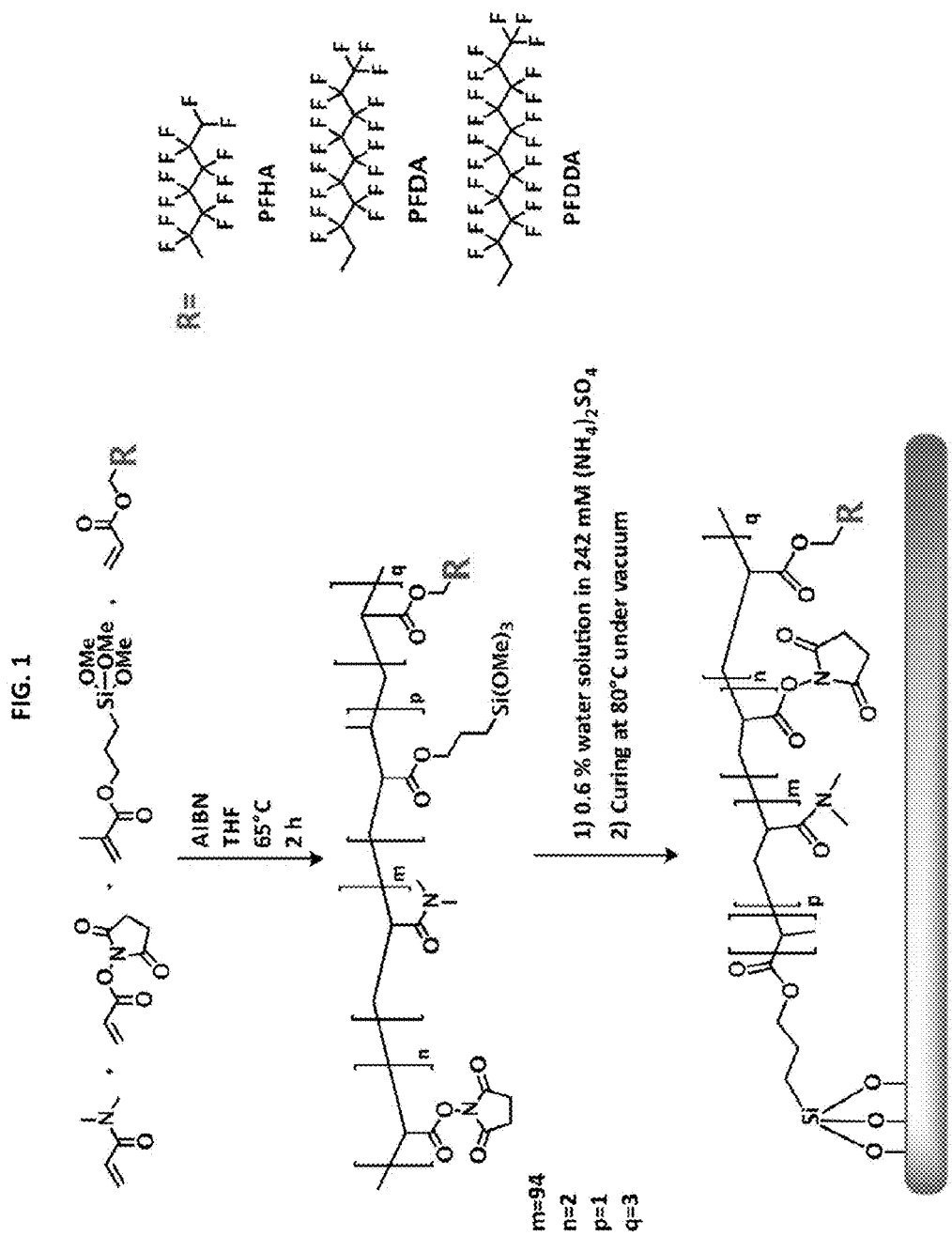
FIG. 1 illustrates scheme of the synthesis of poly(DMA-NAS-MAPS-PFHA), poly(DMA-NAS-MAPS-PFDA) and poly(DMA-NAS-MAPS-PFDDA) and of the coating protocol.

All references cited herein are incorporated by reference including priority U.S. provisional application 62/114,486 filed Feb. 10, 2015 which is hereby incorporated by reference in its entirety including working examples, FIGS. 1-4, descriptions of FIGS. 1-4, and claims.

When "comprising" or "comprises" is used herein, these terms also include within their scope "consisting essentially of", "consists essentially of," and "consisting of."

In a lead embodiment, provided is a composition comprising: at least one copolymer comprising at least the following repeat units: A) at least one surface interacting monomer repeat unit, B) at least one monomer repeat unit bearing a chemically active group, C) optionally, at least one silane monomer repeat unit, and D) at least one fluorinated monomer repeat unit, wherein monomer repeat units A, B, optional C, and D are different from each other. Alternatively, provided is an embodiment for a composition comprising: at least one copolymer comprising at least the following repeat units: A) at least one surface interacting monomer repeat unit, B) at least one monomer repeat unit bearing a chemically active group, and D) at least one fluorinated monomer repeat unit, wherein monomer repeat units A, B, and D are different from each other.

If desired, more than one monomer repeat unit A, more than one monomer repeat unit B, more than one monomer repeat unit C, and more than one monomer repeat unit D can be present in the same copolymer. For example, for monomer repeat unit A, the copolymer could include both dimethylacrylamide and diethylacrylamide repeat units. Both are considered monomer repeat units A.

Various elements and embodiments are described in more detail.

Copolymers

Polymers, uncrosslinked and crosslinked polymers, copolymers, terpolymers, random versus block microstructures, oligomers, monomers, methods of polymerization and copolymerization, molecular weight, measurements, and related materials and technologies are generally known in the polymer arts and can be used in the practice of the presently described embodiments. See, for example, (1) *Contemporary Polymer Chemistry*, Allcock and Lamp, Prentice Hall, 1981, (2) *Textbook of Polymer Science,* 3rd Ed., Billmeyer, Wiley-Interscience, 1984, and (3) G. Odian, *Principles of Polymerization,* 2nd ed., Wiley-Interscience (1981).

In particular, copolymers, including synthetic copolymers, are generally known in the art and can be prepared by methods of copolymerization, including free-radical copolymerization, which are known in the art. The number of comonomers can be two or more, three or more, four or more, fiver or more, and the like. As known in the art, the copolymer molecular structure includes the backbone and side groups. The microstructure of the copolymer can be, as known in the art, generally a random microstructure.

The polymeric backbone can be an all-carbon backbone represented by, for example, $-[CR_aR_b-CR_cR_d]_n-$; wherein R is for the different groups which will provide for the functions of the monomeric repeat units A, B, optional C, and D. In many cases, $R_a$ and $R_c$ can be H and $R_b$ can be H or methyl. $R_d$ can then provide the function of the repeat unit as discussed for monomer repeat units A, B, C, and D. In some embodiments, at least 90 mole %, or at least 95 mole %, or at least 99 mole % of the monomer repeat units are units A, B, optional C, and D. Other unspecified monomer repeat units such as E or F can be present, but in a preferred embodiment, the polymer backbone consists of or consists essentially of only the repeat units A, B, optional C, and D.

There is no particular limitation on molecular weight, and molecular weight can be adapted for the need, but the number average molecular weight can be, for example, about 5,000 to about 100,000, or about 10,000 to about 50,000.

Preferred embodiments include, for example: the copolymer has a backbone which is an all carbon backbone; the monomer repeat units A, B, optional C, and D are N-substituted acrylamide, N-substituted methacrylamide, acrylate, or methacrylate monomer repeat units; the the copolymer consists essentially of the monomer repeat units A, B, optional C, and D; the copolymer consists of the monomer repeat units A, B, optional C, and D; the copolymer is a random copolymer; and the copolymer is a random copolymer represented by:

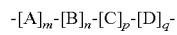

wherein A, B, optional C, and D are the monomer repeat units, and the values of m, n, p, and q determine the percent molar amounts of the repeat units of A, B, optional C, and D, respectively in the copolymer; and/or wherein m+n+p+q=100 and m is 93-97, n is 1-3, p is 0-3, and q is 1-5.

Repeat Unit (A)

Monomeric repeat unit A can result from use of monomers called A'.

The monomeric repeat unit A functions to provide surface interaction or the function of having the polymer absorb to the substrate surface. See, for example, U.S. Pat. No. 8,809,071 and WO 2011/124715.

In one embodiment, the surface interacting monomer repeat unit A is a polymerized form of monomer selected from the group of (i) N-substituted acrylamide or (ii) N-substituted methacrylamide, with each being independently mono- or di-substituted on the nitrogen by $C_1$ to $C_{12}$ linear or branched alkyl, halo-substituted $C_1$ to $C_{12}$ alkyl, methoxy-substituted $C_1$ to $C_{12}$ alkyl or hydroxyl-substituted $C_1$ to $C_{12}$ alkyl, or (iii) vinylpyrrolidone.

In one embodiment, the surface interacting monomer repeat unit A is represented by:

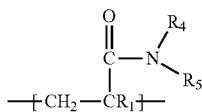

wherein $R_1$ is H or methyl, and $R_4$ and $R_5$ are independently optionally substituted alkyl groups, including for example $C_1$-$C_{24}$ groups, or $C_1$-$C_{12}$ groups or $C_1$-$C_4$ groups. In some embodiment, one of $R_4$ or $R_5$ can be a H rather than an alkyl group.

In one embodiment, the monomeric repeat unit A can be a polymerized acrylamide moiety including, for example, a monomeric repeat unit which comprises at least one N,N-substituted acrylamide repeat unit such as polymerized dimethylacrylamide. Monosubstituted acrylamide can also be used.

In a preferred embodiment, the surface interacting monomer repeat unit A is a polymerized form of monomer dimethylacrylamide or diethylacrylamide.

As used herein, the terms "acrylamide" and "methacrylamide" when used to describe monomers and monomer repeat units can include the family of substituted forms of the core unsubstituted molecules called "acrylamide" and "methacrylamide." In an acrylamide or methacrylamide monomer and repeat unit, a group such as an alkyl group can be bound to the (meth)acrylic acid moiety through an amide bond.

Repeat Unit (B)

Monomeric repeat unit B can result from use of monomers called B'.

In one embodiment, for the monomer repeat unit bearing a chemically active group, B, the chemically active group can be reactive to nucleophilic groups such as amino groups which are commonly found in biomolecules. However, the chemically active group can be reactive in other ways with a biomolecule including reacting with electrophilic groups or reactive by addition reactions, for example.

In one embodiment, for the monomer repeat unit bearing a chemically active group, B, the chemically active group is selected from the group of thiols, primary amines, secondary amines, tertiary amines, quaternary ammoniums, phosphines, alcohols, carboxylic acids, vinylsulfonyls, aldehydes, epoxides, hydrazides, succinimidyl esters, carbodiimides, maleimides, iodoacetyls, isocyanates, isothiocyanates, aziridines, sulfonates or halides.

In one embodiment, the monomer repeat unit bearing a chemically active group, B, the chemically active group is a succinimidyl ester.

In one embodiment, the monomer repeat unit bearing a chemically reactive group, B, is represented by:

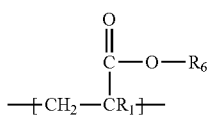

wherein $R_1$ is H or methyl and $R_6$ is a group providing the chemically reactive group. The group $R_6$ can be a ring structure; it can also bond to the oxygen via a nitrogen atom. $R_6$ can be, for example, a succinimidyl group bonded to the oxygen via the nitrogen atom of the ring.

In one embodiment, the monomer repeat unit bearing a chemically active group B is a polymerized form of glycidyl methacrylate or N-acryloyloxysuccinimide.

Optional Repeat Unit (C)

Monomeric repeat unit C, which is optional, can result from use of monomers called C'. The monomer repeat unit C is optional, but in one preferred embodiment is present.

In one embodiment, the silane monomer repeat unit C is present and is represented by:

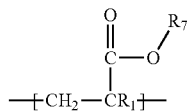

wherein $R_1$ is H or methyl and $R_7$ comprises a silane moiety. The silane moiety can be in the form of a reactive silane moiety which reacts with surface hydroxyl groups as known in the art.

In one embodiment, the silane monomer repeat unit is present and is selected from the group of a polymerized form of a monomer which is an alkoxy silane monomer or an acyloxy silane monomer.

In one embodiment, the silane monomer repeat unit is present and is represented by the formula in polymerized form as known in the art: $R*SrR'_nY_{3-n}$ wherein $R*$ is an ethylenically unsaturated hydrocarbyl, hydrocarbyloxy or (meth)acryloxyhydrocarbyl group, $R'$ is an aliphatic saturated hydrocarbyl group, n is 0 or 1 or 2 and Y is a hydrolyzable organic group. In one embodiment, $R*$ is vinyl, allyl, isopropenyl, butenyl, cyclohexenyl or gamma-(meth)acryloxypropyl and Y is methoxy, ethoxy, formyloxy, acetoxy, propionyloxy. In the monomer repeat unit, the polymerized form of the group is present as known in the art.

In one embodiment, the silane monomer repeat unit is present and is selected from the group of: vinyltrimethoxy silane, vinylbismethoxyethoxy silane, vinyltriethoxy silane, gamma-(meth)acryloxypropyltrimethoxy silane, gamma-(meth)-acryloxypropyltriethoxy silane and vinyltriacetoxy silane, in their polymerized forms as known in the art.

In one embodiment, the silane monomer repeat unit is present and is gamma-(meth)-acryloxypropyltrimethoxy silane in its polymerized form as known in the art.

Repeat Unit (D)

Monomeric repeat unit D can result from use of monomers called D'.

As used herein, the term "fluorinated monomer repeat unit" means a repeat unit which has at least one fluorine in its structure. Preferably, the fluorine is in the copolymer side group rather than on the copolymer backbone. The fluorinated monomer repeat unit can be a perflourinated moiety as known in the art. In the fluorinated monomer repeat unit, there can be more C—F bonds than C—H bonds in the side group of the fluorinated monomer repeat unit.

In one embodiment, the only monomeric repeat unit of the copolymer which has a fluorine is monomeric repeat unit D. Monomeric repeat units A, B, and optional C in this embodiment do not have a fluorine.

In one embodiment, the fluorinated monomer repeat unit D is an acrylate, a methacrylate, an N-substituted acrylamide, or an N-substituted methacrylamide. In one embodiment, the fluorinated monomer repeat unit D is an acrylate or a methacrylate, and preferably, the fluorinated monomer repeat unit D is an acrylate. Again, in an acrylamide or methacrylamide monomer and repeat unit, a group such as an alkyl group can be bound to the (meth)acrylic acid moiety through an amide bond.

In one embodiment, the fluorinated monomer repeat unit D is represented by:

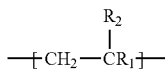

wherein $R_1$ is methyl or H, and $R_2$ is a fluorinated group, including for example a $C_1$-$C_{25}$ fluorinated group a $C_6$-$C_{15}$ fluorinated group. The $R_2$ group can include moieties such as —C(O)O— or —C(O)N═ for carboxylic and amide moieties, respectively. A fluorinated moiety can be linked to these groups in $R_2$. The $R_2$ group, which also can be called an $R^F$ group, can be linear, cyclic, or cyclo linear in nature. The $R_2$ group, for example, can comprise a linear alkyl group which is fluorinated or can comprise a cyclic group such as norbornyl which is fluorinated.

In one embodiment, the fluorinated monomer repeat unit D is represented by:

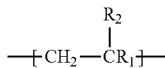

wherein $R_1$ is H or —$CH_3$, and $R_2$ is —C(O)O—$R_3$ or —C(O)NH$R_3$, wherein $R_3$ is a monovalent $C_1$-$C_{15}$ or $C_6$-$C_{15}$ fluorinated group having a terminal $CF_3$ group and at least one —$CF_2$-group, including for example a monovalent $C_1$-$C_{15}$ or $C_6$-$C_{15}$ fluorinated group having a terminal $CF_3$ group and at least five —$CR_2$-groups, and also including for example a monovalent $C_6$-$C_{15}$ fluorinated group having a terminal $CF_3$ group and at least five —$CF_2$-groups and at least one —$CF_2$-group.

Specific examples of monomers D' which can provide D include, for example, include pentafluorophenyl methacrylate; pentafluorophenyl acrylate; 1,1,1,3,3,3-hexafluoroisopropyl acrylate; bis-(2,2,2-trifluoroethyl) itaconate; bis-(1,1,1,3,3,3-hexafluoroisopropyl) itaconate; 1H,1H,3H-tetrafluoropropyl methacrylate; hexafluoro-iso-propyl methacrylate; 1H,1H,3H-hexafluorobutyl acrylate; 1H,1H,3H-hexafluorobutyl methacrylate; 1H,1H,7H-dodecafluoroheptyl methacrylate; 2,2,2-trifluoroethyl acrylate; 2,2,2-trifluoroethyl methacrylate; 1H,1H,2H,2H-heptadecafluorodecyl methacrylate; 1H,1H,2H,2H-heptadecafluorodecyl acrylate; 1H,1H,5H-octafluoropentyl acrylate; and 1H,1H,5H-octafluoropentyl methacrylate.

Specific examples are further described in the working examples.

See also U.S. Pat. Nos. 5,086,138; 5,739,236; and CN 1061785 for fluoropolymers and fluoromonomers.

Amounts

The amounts of each of the monomer repeat units A, B, optional C, and D can be adapted to provide the desired performance for a particular application. The molar amount of the monomer repeat units in the copolymer can be determined as known in the art based on the total amount of monomer repeat units. This can be estimated from the amount of the monomers used to prepare the copolymer and then confirmed as appropriate by analysis of the copolymer structure. The amounts of the monomer repeat units in the copolymer can be adapted by the amount of monomer used to make the copolymer and knowledge of monomer reactivit and testing knowledge, as known in the art. Of course, the sum total for each of the molar amounts for each monomer is 100%. If there is more than one particular monomer repeat unit (e.g., mixture of two monomer repeat units A), the amounts of each are added and the sum used.

In some embodiments, the molar amount of monomer repeat unit A is over 50%, and in at least some embodiments, is more than the sum of the molar amounts of monomer repeat units B, optional C, and D.

For example, the molar amounts of the repeat units can be:
A) for monomer repeat unit A, 65% to 99%;
B) for monomer repeat unit B, 0.1% to 10%;
C) for monomer repeat unit C, 0% to 10%;
D) for monomer repeat unit D, 0.1% to 15%.
wherein the sum total for each of the molar amounts for the copolymer is 100%.

In another embodiment, the molar amounts of the repeat units can be:
A) for monomer repeat unit A, 90% to 99%;
B) for monomer repeat unit B, 1% to 5%;
C) if present, for monomer repeat unit C, 0% to 5%;
D) for monomer repeat unit D, 1% to 10%.

In particular, the amount of the monomer repeat unit D, which is fluorinated, can be adapted to provide for a good performance in a device. For example, the amount of D can be used to tune the hydrophobicity of a film of the copolymer in a microarray device.

As described above, the copolymer can be a random copolymer represented by:

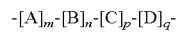

wherein the values of m, n, p (if not zero), and q are adapted to provide the performance and desired percentage.

More amount information is provided in the working examples.

Method of Making Copolymer

Also provided herein are methods of making copolymers and the copolymers which results from these methods. For example, one embodiment is a method of forming the copolymer composition as described herein, under suitable conditions wherein the method comprises polymerizing under suitable conditions at least one first monomer A' which provides for monomeric repeat unit A, with at least one of each of monomers B', C', and D', which respectively provide for monomeric repeat units A, B, C, and D, respectively, with C' and C being optional. In one embodiment, the polymerizing is carried out by free radical polymerization. Random copolymerization can be encouraged. Known polymerization initiators and temperatures can be used. Polymerization can be carried out in an organic solvent. The end groups of the copolymer are not particularly limited. Suitable polymerization time can be used. Molecular weight can be controlled. Conditions can be used so that soluble copolymers are formed. Ethylenically unsaturated monomers can be used including, for example, N-substituted acrylamide, N-substituted methacrylamide, acrylate, or methacrylate monomers. In one embodiment, each monomer is an N-substituted acrylamide, N-substituted methacrylamide, acrylate, or methacrylate.

In one embodiment, the polymerizing is carried out only with monomers A', B', and D', or only with monomers A', B', C', and D' (monomer C' being optional). In one embodiment, only one A' monomer is used, and only one B' monomer is used, and only one C' monomer is used (if C' is used), and only one D' monomer is used. For example, Scheme I, below, shows an example where only one monomer of each type is used.

Specifically, one embodiment is a method for making the composition as described herein comprising copolymerizing: i) at least one monomer to provide monomer repeat unit A in the copolymer; ii) at least one monomer to provide monomer repeat unit B in the copolymer; iii) optionally, at least one monomer to provide monomer repeat unit C in the copolymer; and iv) at least one monomer to provide monomer repeat unit D in the copolymer.

The copolymer can be purified by methods known to the person skilled in the art such as precipitation, fractionation, extraction, and the like.

A preferred embodiment is a copolymer obtained by the random radical polymerization of dimethylacrylamide (DMA), acryolyloxysuccinmide (NAS), methacryloylpropyltrimethoxysilane (MAPS) and a perfluoroalkyl(meth) acrylate. An example, with use of PFDA, is shown below in Scheme 1.

The concentration of the copolymer in a liquid solution can be adapted for the need, but can be, for example, 0.1 wt. % to 10 wt. %, or 0.5 wt. % to 5 wt. %.

In one embodiment, the composition further comprises at least one salt. The salt can be an ammonium salt or it can be a sulfate salt. The salt can be ammonium sulfate.

The concentration of the salt can be, for example, 0.1 M to 0.9 M, and more particularly, can be 0.1 M to 0.5 M. Concentration can be expressed as percentage of its saturation concentration.

Other possible additives include, for example, salts including moieties such as, $CO_2$—, $SO_2$—, $HPO_2$—, magnesium (2+), lithium (1+), zinc (2+) and aluminium (+3).

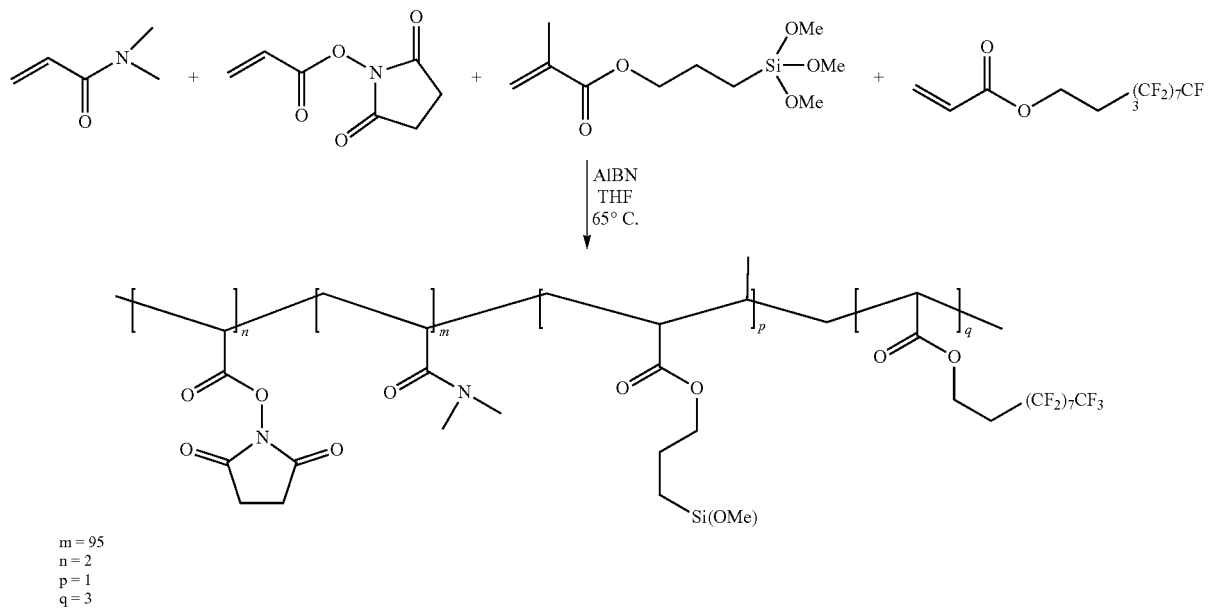

m = 95
n = 2
p = 1
q = 3

Compositions and Liquid Compositions

The copolymers described herein can be mixed with other components. The copolymers, for example, can be a blend of components and a blend of polymers. For example, the copolymer could be blended with another copolymer in which the second copolymer comprises monomer repeat units A, B, and C, as described herein (but no D monomer repeat unit). An example of the second copolymer in the blend is copoly(dimethylacrylamide-acryolyloxysuccinmide-methacryloylpropyltrimethoxysilane)-copoly(DMA-NAS-MAPS)-. The amount of each copolymer in the blend can be adapted for the need. In addition, components can be used which facilitate film adsorption for a particular surface.

Also, the copolymers can be soluble and mixed with solvents including water and organic solvents. The solvent system can be for example water alone, or water mixed with one or more miscible solvents. Water can be also present in the film with the copolymer being in a hydrated state. The pH of an aqueous solution can be also adapted to the need. Examples of organic solvents include THF and DMF.

One embodiment therefore is a composition comprising at least one copolymer as described herein and at least one solvent for the copolymer. In one embodiment, the solvent is water.

Articles and Devices

Another embodiment is an article and/or device comprising the composition and copolymers described herein. Examples of articles and/or devices include microarrays, sensors, channels, microchannels, nanochannels, walls, capillaries, chromatographic devices, separation devices. In particular embodiments, the device is a microarray or a microchannel for electrophoresis. As used herein, the term "microarray" can be construed broadly to cover a variety of arrays and nanoarrays of different dimensions, densities, resolution capabilities, and functions. Microarrays are known in the art. See, for example, Muller and Roder, Microarrays, Elsevier, 2006 and Kohane, Kho, Butte, Microarrays for an Integrative Genomics, MIT Press, 2003. See also, for example, U.S. Pat. No. 8,809,071 and WO 2011/124715 which describe copolymers which can be used in microarrays and which is hereby incorporated by reference in its entirety.

One embodiment is a microarray device in which the composition as described herein is coated as a film on a substrate. The composition can be a film disposed on a substrate.

The thickness of the film can be varied to the need but usually a very thin film is desired. Adsorption can provide for a nanometer scale thickness film (e.g., nanolayers can be used). For example, film thickness can be, for example, 1 nm to 100 nm, or 2 nm to 75 nm, or 3 nm to 50 nm, or 3 nm to 25 nm, or 3 nm to 10 nm.

In addition, the water contact angle based on the copolymer surface can be tuned, or controlled, and measured. For example, water contact angle can be at least 40°, or at least 45°, or at least 50°. No particular upper limit for the contact angle is present, but that range for the water contact angle can be, for example, 40°-80°, or 45°-70°, or 50°-70°.

In another embodiment, the device and the film in the device is in reacted form wherein the copolymer has reacted with, for example, a biomolecule. Biomolecules are known in the art and are used in, for example, industrial, medical, diagnostic, and research applications. As used herein, water and other solvent compounds is not a biomolecule. Binding, including covalent binding, of biomolecules is well-known. For example, a nucleophile on the biomolecule can react with an electrophile on the copolymer. Preferred examples are oligomeric and polymeric materials including peptides, proteins, enzymes, nucleic acids, DNA, RNA, carbohydrates, antibodies, antigens, and the like. The biomolecule which is attached to a cell or virus or other kinds of bio structures and ultrastructures can be also used. The biomolecule can be part of a complex structure or species.

More generally, biological species which can include one or more biomolecules include, for example: enzymes, organic catalysts, ribozymes, organometallics, proteins, glycoproteins, peptides, polyamino acids, antibodies, nucleic acids, steroidal molecules, antibiotics, antimycotics, cytokines, carbohydrates, oleophobics, lipids, extracellular matrix material and/or its individual components, pharmaceuticals, and therapeutics. Cells, such as, mammalian cells, reptilian cells, amphibian cells, avian cells, insect cells, planktonic cells, cells from non-mammalian marine vertebrates and invertebrates, plant cells, microbial cells, protists, genetically engineered cells, and organelles, such as mitochondria, are also bioactive species which can include one or more biomolecules. In addition, non-cellular biological entities, such as viruses, virenos, and prions are considered bioactive species which can include one or more biomolecules.

In the presently claimed inventions, materials on which the film or coating is made, e.g., also called substrates, can be among others: inorganic solid materials, organic solid materials, hydroxylated surfaces and substrates, glass, silicon, silicon oxide, nitride, polydimethylsiloxane, plastic, Teflon, polystyrene, gold, indium thin oxide. Suitable plastic materials are, for instance, made of polystyrene, polycarbonate, polyvinylchloride, and polypropylene. Substrates can be pre-treated or pre-activated as desired. For example, washing can be carried out including washing with acidic or basic solutions (e.g., NaOH in water). Plasma treatment can be carried out. The substrates can be substrates known or used in the arts of biochemistry and analysis, whether flexible or rigid. Also, the substrate material and substrate can be in any shape: flat substrates, tubes, capillaries, nanopore walls, wells, non sensor areas of all possible geometry and more specifically biosensors.

Microarrays can be used as known in the art with use of a pitch or a spot size pitch. For example, the use of the fluorinated monomer, as demonstrated in the working examples, can help improve the range of spot size pitch which can be used. Smaller pitches are made possible. The spots need to be separated from each other well enough for a good analysis to be carried out. The smaller the spot size, the higher the array density, for example. For example, the microarray can be characterized by a spot size pitch of less than 250 microns, or less than 200 microns, or less than 190 microns, or less than 180 microns, or less than 170 microns, or less than 160 microns. In another embodiment, the spot size pitch is in the range of 140 microns to 200 microns, or 140 microns to 190 microns, or 140 microns to 180 microns, or 140 microns to 170 microns.

Devices can be prepared by known coating and film formation methods including dip coating, for example. Films can be dried including use of heat as needed. For example, drying at 25° C. to 100° C. can be used, or drying at 50° C. to 100° C. can be used.

Method of Using Copolymer

The devices described herein also represent embodiments for methods of using the compositions and copolymers. For example, one method of use in in using the copolymer in a microarray or sensor. More specifically, the devices can be used in methods wherein the copolymer is binding with or bound to a biomolecule. In addition, the copolymer can be used in a form wherein one or more of the functionalities of the copolymer are blocked as known in the art. For example, an NAS functionality can be blocked. For example, blocking can help prevent undesired or non-specific binding.

The fabrication of high density microarrays requires a precise control of surface physical and chemical properties, as illustrated more in the following working examples. In fact, spot morphology has a deep impact on signal level and might affect seriously the reliability and reproducibility of the assay. As a consequence, a proper biomolecule deposition and immobilization increases the accuracy of data analysis. As illustrated in the working examples, a new polymeric coating is proposed with intermediate hydrophilic/hydrophobic characteristics able to control the spreading of spots onto the surface as well as their size, thus enabling the reduction of the pitch between spots. The new coating exemplifies the versatility of a copolymer system based on the simultaneous presence of, in preferred embodiments, N,N-Dimethylacrylamide (DMA), 3-(trimethoxysilyl)propyl methacrylate (MAPS) and fluorinated monomers, which impart to the surface a more hydrophobic behavior, reducing the drops spreading and merging. The controlled hydrophobicity allows to control also the size of the spots, thus the possibility of reducing their pitch to, for example, 140 μm and to obtain arrays with smaller dimensions, a very useful characteristics in those applications which imply the use of reduced areas, for example in miniaturized biosensors or microfluidic devices. The obtained copolymer is easily adsorbed onto, for example, glass or silicon oxide from a diluted aqueous solution of the polymer and the result is a microarray surface with intermediate hydrophobic/hydrophilic properties (for example, average water contact angle is 50° and surface energy values are reduced from 114 mN/m to 50 mN/m), which allows decrease of the spot distance without merging of the droplets. To further improve the spot size and morphology, the use of several detergents added to the spotting buffer was also investigated in preferred embodiments: in particular, the use of sucrose monolaurate, together with the hydrophobic surface, permitted the fabrication of surfaces for dense DNA microarray with very high fluorescence signals and low background noise. In fact, as an example of application in DNA microarray, the fluorinated coating has been used for the genotyping of KRAS G12D mutation, a common variant in the KRAS gene implicated in the colorectal cancer.

WORKING EXAMPLES

The following, non-limiting, working examples illustrate, for example, how the polymers of the invention are used for the attachment of molecules to a coated surface. They are not intended to limit in any way the field of the inventions.

1. Materials and Methods

N,N-Dimethylacrylamide (DMA), 3-(trimethoxyylsilyl) propyl methacrylate (MAPS), 1H,1H-perfluoroheptyl acrylate (PFHA), 1H,1H,2H,2H-perfluorodecyl acrylate (PFDA), 1H,1H,2H,2H perfluoro dodecyl acrylate (PFDDA), α,α'-Azoisobutyronitrile (AlBN), anhydrous tetrahydrofuran (THF), ammonium sulphate (($NH_4)_2SO_4$), phosphate buffered saline (PBS), ethanol (EtOH), sucrose monolaurate, Brij 30% solution in water, betaine, sulfobetaine, Tween 20, Triton X100 ethanolamine were purchased from Sigma Aldrich (St. Louis, Mo., USA). All solvents were used as received. N-acryloyloxysuccinimide was synthesized as reported elsewhere [13]. Oligonucleotides for hybridization testing were synthesized by MWG-Biotech AG (Ebevsberg, Germany) and contained the following sequences: COCU8: 5'-NH2-GCCCACCTATAAGGTAAAAGTGA-3', COCU10: 5'-Cy3-TCACTTTTACCTTATAGGTGGGC-3'. COCU10 was labeled with the fluorophore Cyanine 3. These oligonucleotides were freeze-dried and re-suspended in DI water at a final concentration of 100 µM before use. Untreated silicon slides 1000 Å Thermal Oxide (14×14 mm) were supplied by SVM, Silicon Valley Microelectronics Inc. (Santa Clara, Calif. USA) and were pretreated using a HARRICK Plasma Cleaner, PDC-002 (Ithaca, N.Y., USA) connected to an oxygen line. Dual polarization interferometry (DPI) measurements were conducted using an Analight Bio 200 (Farfield Group, Biolin Scientific, Manchester, UK) running Analight Explorer software. Contact angle measurements were collected via the sessile drop method using a CAM 200 instrument (KSVLtd), which utilizes video capture and subsequent image analysis. FT-IR spectra were registered using a Jasco-660 spectrometer and analyzed with Spectra Manager software 1.52 (Jasco, MD, USA). Gel permeation chromatography analyses were performed using a Jasco 880 system connected to a UV detector Jasco Uvidec-100-III using Schodex columns OHpak SB-G (guard column), OHpak SB-804 M HQ, OHpak SB-803 HQ, and OHpak SB-802.5 HQ. (New York, N.Y., USA). The spectra were analysed using the ChromNAV Chromatography data system (Jasco, MD, USA).

2.1 Poly(DMA-NAS-MAPS-perfluoroalkylacrylate) Synthesis

The copolymer, constituted of DMA (94% molar percentage), NAS (2% molar percentage) perfluoroalkylacrylate (3% molar percentage) and 3-(trimethoxysilyl)propyl methacrylate (MAPS, 1% molar percentage), was synthesized by free radical copolymerization. The concentration of the monomer feed in the solvent was 20% w/v. In Table 1, the quantities of each monomer for the syntheses are reported, while a scheme of the synthesis and of the coating procedure is reported in FIG. 1.

In a three-neck round bottom flask, 20 mL of anhydrous THF was degassed under argon for 20 minutes. DMA (filtered over aluminum oxide to remove the inhibitor), NAS, perfluoroalkylacrylate monomer (PFHA or PFDA or PFDDA) and AIBN (0.01 g; 0.08 mmol; final concentration 2 mM) were added under argon flow, and the stirred solution was degassed for an additional 10 minutes. Subsequently, MAPS was added, under inert atmosphere, and the solution was polymerized at 65° C. for 2 hours. The reaction was stopped by cooling to room temperature; the polymer solution was diluted 1:1 by adding 20 mL of anhydrous THF and precipitated in 400 mL of petroleum ether. The product was collected as a white powder by filtration on a Buckner funnel and dried under vacuum at room temperature.

2.2 Coating of Microarray Slides and Glass Substrates with poly(DMA-NAS-MAPS-perfluoroalkyacrylate)

Slides were pretreated with oxygen plasma for 10 minutes; the oxygen pressure was set to 1.2 bar with a power of 29.6 W. Poly(DMA-NAS-MAPS-PFHA) or poly(DMA-NAS-MAPS-PFDA) or poly(DMA-NAS-MAPS-PFDDA) were dissolved to a final concentration of 0.6% w/v in DI water containing 242 mM of ammonium sulphate (($NH_4)_2SO_4$). The slides were immersed into the polymer solution for 30 minutes, rinsed in DI water, dried with nitrogen flow, and then cured at 80° C. under vacuum for 15 minutes.

2.3 Goniometry

Contact angle and surface energy measurements were collected via the sessile drop method using a CAM 200 instrument and software (KSV Ltd), which utilizes video capture and subsequent image analysis. Deionized water was used, and its purity was confirmed by correlating the measured surface tension based on the pendant drop shape to the literature values for pure water (72 mN/m at 25° C.). The same measurements were performed using water solution of six detergents (sucrose monolaurate, brij, betaine, sulfobetaine, Tween 20 and Triton) at a final concentration of 0.01% w/v.

2.4 GPC Analysis

The size of each polymer was characterized using Gel Permeation Chromatography (GPC) in tandem with a UV detector. The GPC setup consists of three Shodex aqueous GPC columns in series: OHpak SB-G (guard column), OHpak SB-804 M HQ, OHpak SB-803 HQ and OHpak SB-802.5 HQ. Each column was packed with a polyhydroxymethacrylate gel and connected in series with a decreasing exclusion limit. The columns were maintained at 40° C. throughout each run. The molecular weight was calculated using a calibration curve obtained using polyacrylamide standards with molecular weights ranging from 22 KDa to 400 KDa.

Dry copolymers samples were diluted using the GPC mobile phase (GPC buffer: 100 mM NaCl, 50 mM $NaH_2PO_4$, titrated to pH 3.5 using $H_3PO_4$, 10% v/v acetonitrile) to a concentration of 0.25 mg/mL and the samples were run three times through the GPC system to test for reproducibility. Each run injected 20 µL of sample to be analyzed and the flow rate through the system was held at a constant 0.35 mL/min.

2.5 FT-IR Spectra Analyses

FT-IR spectra were collected on a Jasco 660 spectrophotometer with a computer running Spectra Manager 1.52 software. The samples were mixed with KBr and pressed to give a tablet. Then 32 scans were recorded over the range 4000-400 $cm^{-1}$ at a resolution of 4 $cm^{-1}$ at intervals of 1 $cm^{-1}$. The spectra of a blank KBr tablet have been subtracted using the Spectra Manager software. To highlight the signals of the perfluoroalkylacrylate compounds, the spectrum of a polymer that does not contain these monomers (poly(DMA-NAS-MAPS)) has been subtracted to the other spectra using the Spectra Manager software.

2.6 DPI Measurements

The experiments were performed at 20° C. using PBS. A silicon oxynitride AnaChip™ surface treated with oxygen plasma was used in this study. To measure the coating thickness, the chip was inserted into the fluidic compartment of Analight Bio 200 and treated with the polymer solution as prepared in paragraph 2.2. The polymer solution was slowly introduced to the chip channels at a flow rate of 6 µL/min for 15 minutes. The flow was then stopped, and the solution was let in contact with the surface for 30 minutes before washing the channel with PBS, which was injected into the channel at a flow rate of 50 µl/min for 16 hours.

Before each experiment, a standard calibration procedure was performed using 80% (w/v) ethanol and MQ water solutions. The data were analyzed using Analight Explorer software to calculate the mass of the polymers.

To test the antifouling properties of the coatings, 200 µl of a solution of BSA 10 mg/mL in PBS was injected after the overnight wash in PBS at a rate of 20 µl/min. After the injection the channels were washed with PBS.

2.7 Functional Test of Microarray Slides

Spotting. The oligonucleotide 5'-NH2-GCCCAC-CTATAAGGTAAAAGTGA-3' (COCU8) was dissolved in a 150 mM sodium phosphate buffer solution at pH 8.5 with a final concentration of 10 µM in the presence of various additives. The oligonucleotide was spotted using a SCE-NION sci-FLEXARRAYER S5 non-contact microarray spotter with a 80 or 50 µm nozzle. The spot volume, temperature and humidity were precisely controlled to 200 µL, 22° C. and 65%, respectively. Four sub-arrays were created on each coated silicon chip and the spot to spot center distance was varied. After spotting, the chips were placed in a sealed chamber, saturated with sodium chloride (40 g/100 mL $H_2O$), and incubated overnight. After incubation, silicon chips were immersed in a pre-heated blocking solution made of ethanolamine (50 mM) in 0.1 M TRIS/HCl buffer pH 9 and kept at 50° C. for 15 minutes. After the blocking step, the chips were rinsed with DI water and immersed in a pre-heated solution of 4×SSC (600 mM sodium chloride, 60 mM sodium citrate, pH 7.0) and 0.1% SDS and kept at 50° C. for 15 minutes, before rinsing with DI water and drying with a nitrogen flow.

Hybridization. The spotted and blocked silicon chips were incubated with a complementary oligonucleotide target, 5'-Cy3-TCACTTTTACCTTATAGGTGGGC-3', (COCU10) labeled with cyanine 3 for fluorescence detection. COCU10 was dissolved to a final concentration of 1 µM in an aqueous solution containing 2×SSC, 0.1% SDS and 0.2 mg/ml of BSA; 15 µl of this solution were deposited on the array, and a coverslip was used to cover the hybridizing area. The hybridization reaction was conducted in a humid chamber at 65° C. for 2 hours.

Finally, the chips were rinsed in 4×SSC at room temperature to remove the coverslip and then any unbounded oligonucleotide was removed using two consecutive washes (5 minutes each) with a 2×SSC/0.1% SDS solution, pre-warmed at hybridization temperature (65° C.). This operation was followed by other two washes with 0.2×SSC and 0.1×SSC, carried out both at room temperature for 1 min; finally, the slides were dried using the nitrogen stream.

Images of each chip were obtained using the ScanArray Lite confocal laser scanner by Perkin Elmer with the laser power kept constant at 22% and the photomultiplier tube gain (PMT) at 64% and analyzed using ScanArray Express software.

2.8 DNA Microarray: KRAS G12D Genotyping

Mutant (G12D mutation) and wild-type samples were obtained as described in [14]. Exon 2 of the KRAS gene was amplified and purified as reported in [15]. Amino-modified PCR products were eluted in 35 µL of 1× printing buffer (150 mM sodium phosphate pH 8.5, Triton X100 0.01%). Three µL of the amino-modified amplicons (2 control wild-type, 2 heterozygous samples and 2 homozygous mutant samples) were printed in 6 replicates using a piezoelectric spotter, SciFLEXARRAYER S5 (Scienion Germany), on silicon chip coated with poly(DMA-NAS-MAPS-PFDA). An amino-modified oligonucleotide labelled with Cy3 was spotted as a positional reference. The processing of the silicon chip before and after the spotting step is described in the section 2.7. Immediately before hybridization, the printed chip was dipped in 0.1 M NaOH for 5 min to denature the double-stranded immobilized amplicons, subsequently rinsed with water and dried. Sequences of reporters and stabilizers are detailed in [15]. In the first step, 0.5 µL of the stabilizer oligonucleotide were mixed with 49.5 µL of hybridization buffer (2×SSC, 0.1% SDS, 0.2 mg/mL BSA) up to IgM final concentration and spread onto the spotted area of the chip. The chip was incubated at 20° C. for 30 min in the Thermomixer Comfort (Eppendorf) hybridization chamber, and then washed at room temperature in a 4×SSC buffer to remove the cover slip. This first wash step was followed by a brief wash (30 s) in a low-salt buffer (0.2×SSC). Then, for the detection of G12D mutation, the reporter for the wild-type and the mutated sequence and their corresponding universal oligonucleotides labelled with Cy3 and Cy5 respectively, were mixed together in equimolar amounts (final concentration 1 µM) and added to the hybridization buffer (2×SSC, 0.1% SDS, 0.2 mg/mL BSA). The chip was incubated at 37° C. for 1 h in the Thermomixer Comfort (Eppendorf) hybridization chamber. Finally the silicon chip was removed from the hybridization chamber and soaked briefly in 4×SSC buffer to remove the cover slip, washed twice for 5 min in 2×SSC/0.1% SDS, pre-warmed at the specific hybridization temperature (37° C.), then dipped, in sequence, in a solution 0.2×SSC and 0.1×SSC for 1 min at room temperature, dried by centrifuging at 780 rpm for 3 min and scanned [16].

ScanArray Lite was used to scan the hybridized chip. In particular a green laser ($\lambda_{ex}$ 543 nm/$\lambda_{em}$ 570 nm) for the Cy3 dye and a red laser ($X_{ex}$ 633 nm/$X_{em}$ 670 nm) for the Cy5 dye were applied. The photomultiplier (PMT) tube gain and the laser power changed between fluorochromes and different experiments. 16-bit TIFF images were analyzed at 5 µm resolution. Data intensities were extracted with the ScanArray Express software and the data analysis was performed as described in [17].

Discussion of Working Example Results

The hydrophobic/hydrophilic nature of a microarray support plays a significant role in the development of a high sensitivity assay. It is generally acknowledged that surfaces with low surface energy adsorb macromolecules more strongly than hydrophilic ones because, in the contact, water molecules are released from the biomolecule and from the surface with a large entropy gain. Therefore in the design of the coating, hydrophilicity is of paramount importance. The balance between hydrophilicity and hydrophobicity of the surface has relevant consequences also on the process of deposition of liquid droplets as it controls how the liquid spreads out over the surface as well as the size of the spot. It was observed that for high-energy surfaces, droplets display a thin film around their border, while this micrometer film does not form on low-energy surfaces, because of the counter flow towards the center of the drop which stabilizes it onto the surface, thus resulting in less mobile droplets [18]. A desirable coating must prevent excessive spreading of the droplets as, according to Ekin's theory, spot miniaturization increases detection sensitivity [19] and, at the same time, it allows to concentrate the probe in small areas. In some contexts, the poly(DMA-NAS-MAPS) coating introduced in 2004 [7] provides a surface which is too hydrophilic to allow the creation of a dense array of small size spots with reduced pitch and, as a consequence, it was necessary to increase the hydrophobicity of the film to avoid spot merging. To this aim, fluorinated monomers were introduced into the polymer chain, in small molar fraction so to maintain an optimal ratio between the hydrophobic/hydrophilic nature of the surface.

Another way to prevent droplet spreading and merging consists in adding a less volatile compound to the drop. This phenomenon is explained by the Marangoni effect: the difference in evaporation rates of the two drop components leads to a gradient of surface tension between the border and the center of the droplet, thus generating a force that pulls the liquid towards the center of the drop [18]. For this purpose, also investigated was the use of detergents to reduce the spreading and ameliorate the spot morphology. In fact, surfactants are used to lower surface and interfacial tension and increase wettability of the surface, thus improving the binding of the probe onto a hydrophobic surface and, at the same time, reducing the drop evaporation and refining the spot morphology, thanks to the organization of the hydrophobic tails of detergents at the interface liquid/air. The choice of the surfactants to be used in our study is based on studies performed to demonstrate that the presence of detergents in the fabrication of DNA microarrays is important to improve the overall performance in terms of fluorescence enhancement and reproducibility [20][21][22] and do not affect the DNA structure.

3.1 Polymer Characterization

GPC analyses of the three copolymers (poly(DMA-NAS-MAPS-PFHA), poly(DMA-NAS-MAPS-PFDA) and poly(DMA-NAS-MAPS-PFDDA)) indicate that the polymers have, respectively, the following molecular weight (Mw): $1.04 \times 10^4$ g/mol, $6.08 \times 10^3$ g/mol and $1.57 \times 10^4$ g/mol. The similarity in Mw was expected, considering the difference between the three polymers relies in only one monomer with identical molar fraction along the chain. Polydispersity has been calculated as well and is, respectively, 2.5, 2.02, and 1.23 as expected by a random radical co-polymerization. Furthermore, the GPC analysis highlights the purity of the polymers as no monomer or impurity peaks were detected.

The FT-IR spectra of the polymers (FIG. 2) show a big absorption band at 2900 $cm^{-1}$ due to the stretching of the $CH_2$ groups. A peak around 1740 $cm^{-1}$ corresponds to the stretching of carbonyl group of NAS and MAPS. It is possible to observe also a strong peak at 1640 $cm^{-1}$, which corresponds to the stretching of the DMA carbonyl group. In the magnification area (obtained by subtracting the spectrum of a polymer that does not contain the perfluoroalkylacrylate monomers to the other spectra), the peak at 1457 $cm^{-1}$ (a) corresponds to the CH bending in $CH_2$ groups. Weak bands around 1390 $cm^{-1}$ (b) are assigned to the C—F stretching in $CF_2$—$CF_3$ moieties and the strong absorption at 1238 $cm^{-1}$ (c) represents the CF stretching overlapped with $CH_2$ wagging. Bands d and e (1212 and 1138 $cm^{-1}$) are due to the $CF_2$ asymmetric and symmetric stretching respectively. Small peaks at 650 and 518 $cm^{-1}$ (f and g) are due to the rocking and wagging of $CF_2$ respectively.[23]

3.2 Coating Characterization
3.2.1 Goniometry

The polymeric coating has been analyzed through sessile contact angle. Table 2 reports the contact angles measured using pure water and solutions of 0.01% w/v of different detergents. Surfactants reduce surface and interfacial tension and increase wettability of the surface, while the alkyl tails of the detergent organize at the interface liquid/air reducing the drop evaporation and refining the spot morphology. The following detergents were chosen considering they are employed in the microarray field (http://www.slideshare.net/Nexterion/effect-of-detergent-concentration-and-type-when-printing-on-epoxy-coated-nexterion-slide-e). Contact angles of pure water demonstrate that the presence of a small molar fraction of the perfluoroalkylacrylate monomers increases the hydrophobicity of the coating respect to poly (DMA-NAS-MAPS): in fact the contact angles values increase from 32.96° to about 55°. In general, the presence of detergents reduces the contact angles as it decreases the surface tension, thus improving the wettability of the surface and it facilitates the binding of probes to the functionalized surface. In particular, betaine does not affect the wettability of the fluorinated surfaces as the contact angle does not vary respect to the pure water, while Triton, Brij and Tween 20 lead to low contact angle, similar to those of poly(DMA-NAS-MAPS) thus increasing too much the spreading parameter. Sucrose monolaurate and sulfobetaine show the best behavior also in terms of spot morphology, as it will be demonstrated further. These differences are probably due to the way the detergent interacts with the surface and organizes within the drop and at the drop border, varying the flows that regulate the droplet evaporation and stability on the surface. It is worth noticing that the length of the chain of the perfluoroalkylacrylate monomers does not influence the hydrophobicity of the surfaces, as the contact angles for each detergent are similar in the three coatings. This is probably due to the fact that the fluorinated monomers differ from each other for just few carbons (see FIG. 1), which are probably not enough to change drastically the hydrophobicity of the coated surfaces (see also Supplemental Information below). On the contrary, longer chains would result in polymers with low solubility in water, thus the necessity of a more complicated and less environmental-friendly coating process.

Contact angle values and wettability are strongly correlated to surface energy. In fact, a liquid spontaneously spreads onto a solid surface when the surface energy of the liquid is lower than that of the solid, because the adhesive forces of the liquid and the solid compete against the cohesive forces of the liquid. As a consequence, hydrophilic surfaces usually have a high surface energy, while on the contrary hydrophobic ones have low surface energy. Table 3 reports the surface energy values of slides coated with the fluorinated coatings, compared to poly (DMA-NAS-MAPS), which does not contain the perfluoroalkyl monomers. It can be noticed that the presence of the fluorinated monomers reduces the values of surface energy to about 50 mN/m, while the surface energy of the coating obtained with poly (DMA-NAS-MAPS) is 114.37±19.19 (see Table 3). As a consequence, the values of surface energy further corroborate the increase of hydrophobicity due to the presence of fluorinated monomers. Also in this case, the length of the chain of the perfluoroalkylacrylate monomers does not influence the surface energy values.

3.2.2 Dual Polarization Interferometry

Dual polarization interferometry (DPI) measurements were conducted using an Analight Bio 200 (Farfield Group, Manchester, UK) running Analight Explorer software. The theory behind this technique, which measures optical phase changes in an evanescent dual polarization interferometer, is reported elsewhere [24]. Briefly, DPI is an optical surface analytical technique that provides multiparametric measurements of molecules on a surface to give information on the molecular dimension (layer thickness), packing (layer refractive index, density) and surface loading (mass) [25]. Oxygen plasma activated DPI surfaces have been coated by flowing solutions of the perfluoroalkylacrylate copolymers. Table 4 reports the refractive index, mass, thickness and density of the obtained polymeric films. The data are average of measurements collected after flowing PBS for 24 hours, thus suggesting the high stability of the coating adsorbed onto the surface. In fact, the stability of multifunctional copolymers can be an issue. In this case, the possible side reactions that can occur, even simultaneously, are various and difficult to detect. For example, the high reactivity of the NAS moieties towards nucleophiles, makes it potentially susceptible of hydrolysis; similarly, the high reactivity of siloxane groups can lead to condensations between chains, thus reducing the solubility of the polymer. An extensive study of the stability of a copolymer similar to those presented in this work, but which does not contain the fluorinated monomers (poly(DMA-NAS-MAPS)) was performed and reported in Suriano R. et al. [26]. Considering the similarity of the copolymers in terms of composition, one can assume the aging profile of the copolymers presented in this work is similar to the one presented by Suriano R. and collaborators where it was demonstrated that the stability of the copolymer is compatible with the operative conditions used for the manufacture of the microarray slides. The low values of density, compared to the thickness data, reveal the hydrophobic nature of the coating, which is not prone to be massively hydrated when in contact with aqueous solutions. Also these values confirm the similarity of the three fluorinated monomers in regulating the hydrophobicity of the coatings.

DPI also allows the evaluation of the anti-fouling property of the coatings. A solution of BSA (10 mg/mL in PBS) has been injected after the coating step and no change in any of the parameter has been observed. BSA is known to establish non-specific binding with surfaces through hydrophobic interactions. However, in this case, these interactions are completely prevented by the presence of the coating.

A previous study using Atomic Force Microscopy (AFM) [27] indicates that the roughness of a silicon slide coated with poly(DMA-NAS-MAPS) has a Rq values of 0.097 (expressed as root mean square of the height distribution function). Considering that the composition of the new proposed copolymers is similar to that of poly(DMA-NAS-MAPS), the coatings can be assumed to give an equivalent roughness. In fact, the percentage of the fluorinated monomers is irrelevant respect to the main backbone of dimethylacrylamide (94% vs 3%), while the other ingredients (NAS and MAPS) are used in the same quantities (2% and 1% respectively).

3.3 Functional Test and Spot Morphology

Figure 3A:
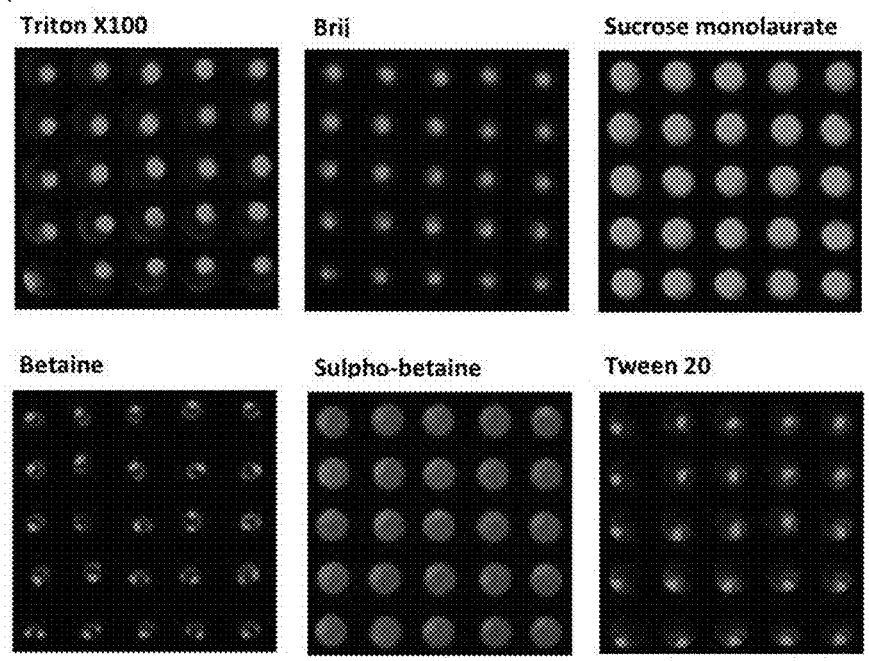
FIGS. 3A-B show (A) Fluorescence images of six arrays of an amino-modified oligonucleotide spotted on poly(DMA-NAS-MAPS-PFDA) coated silicon/silicon oxide slides using different detergents (0.01% w/v) as additive in the spotting buffer and analyzed after hybridization with the complementary Cy3 labeled oligonucleotide. The presence of detergents varies the way drops (and DNA) interact with the surface changing the spot morphology and the fluorescence signal. Spot pitch is 160 μm in each array; (B) Fluorescence intensity signals of the six different arrays. Values are the average of the spots of each array constituted of 20×20 spots. The arrays have been obtained using an 80 μm nozzle; images were scanned using 22% of laser power and 64% of photomultiplier tube gain (PMT).
Figure 3B:
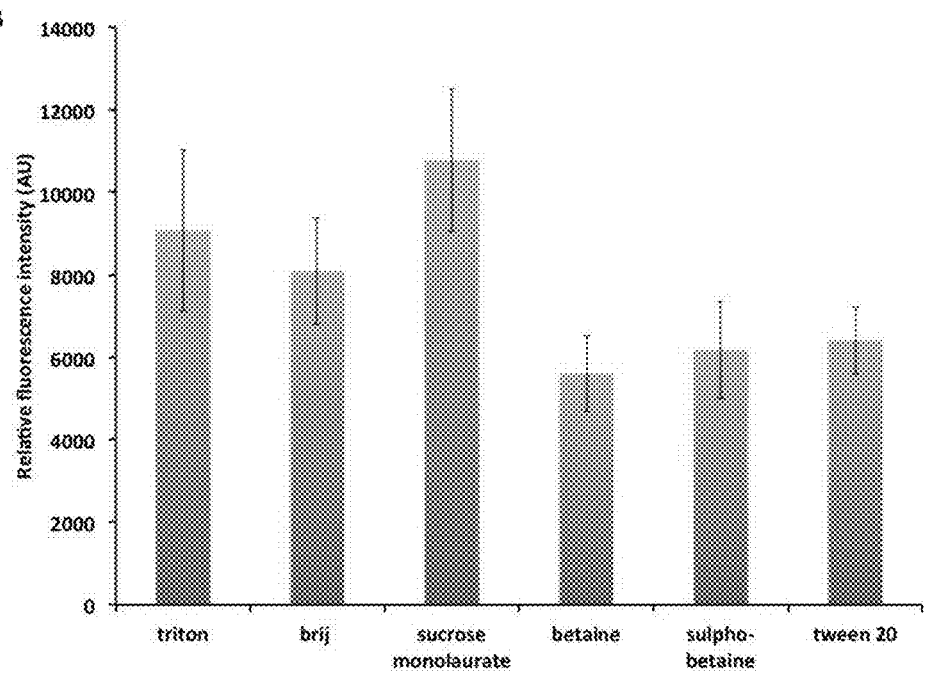

The polymeric coatings formed on the surface by the perfluoroalkylacrylate copolymers, contain active esters (NAS) that react with nucleophilic molecules under mild conditions, for example with the amino group of an amino-modified oligonucleotide. To exemplify the binding capability of surfaces coated with this polymer, coated silicon chips bearing a 100 µm silicon oxide layer [28] were spotted with picoliter volumes of a 23-mer amino-modified oligonucleotide in a microarray format. The covalent attachment was demonstrated by measuring the fluorescence signal produced via the hybridization of an oligonucleotide complementary to the one attached to the surface and labeled with Cyanine3 dye. At the same time, spot size and morphology was investigated as a function of detergents added to the spotting buffer on a silicon oxide chip coated with poly(DMA-NAS-MAPS-PFDA), because the composition of the spotting buffer affects the contact angle and the adhesivity of the liquid to the surface, thus allowing to modulate spot size and array precision. Furthermore, the presence of detergent during the probe immobilization is known to ameliorate the fluorescence signal, thus the limit of detection [20]. In fact, arrays obtained without detergents in the spotting buffer did not give acceptable results in terms of spot homogeneity and fluorescence intensity (data not shown). FIG. 3a shows arrays obtained with six different detergents: it is clear that the best spot morphologies are obtained using sucrose monolaurate and sulfobetaine, while the other surfactants are not able to distribute homogenously the drops, thus the DNA, onto the surface, generating spots different in size and shape. Irregular spots reflect onto the fluorescence signals: FIG. 3b shows the fluorescence intensity registered for each of the above-mentioned arrays. Sucrose monolaurate gives the higher fluorescence intensity as it probably distributes DNA probes homogenously onto the surface with a proper density for hybridization, and facilitates an even evaporation of the spot. Supho-betaine gives similar spots, but the fluorescence intensity is lower than the sucrose-monolaurate (FIGS. 3a and b), which is chosen as the best detergent and thus used in all the following experiments. The other two coatings, poly(DMA-NAS-MAPS-PFHA) and poly(DMA-NAS-MAPS-PFDDA) gave similar results in terms of spot morphology and fluorescence intensity (See FIG. 6), thus poly(DMA-NAS-MAPS-PFDA) was chosen for further investigations.

In a separate test, the possibility of reducing the pitch between spots was evaluated, thus reducing the dimensions of the entire array, which is very useful in those applications where the area dedicated to probe immobilization is limited. As mentioned before, the copolymer poly(DMA-NAS-MAPS), introduced in 2004 [7], provides a coating which is too hydrophilic to allow the creation of a dense array of small size spots. In fact, the standard spot-to-spot distance used to avoid merging on poly(DMA-NAS-MAPS) coated surfaces, is 500 µm [29] [15]; it was demonstrated that the minimum distance between spots is 200 µm (data not shown) while scaling the pitch to 160 µm causes a coalescence of the spots (FIG. 4a). In fact, on this coating, the DNA drops are too mobile onto the surface and tend to move towards each other. As said previously, on hydrophilic surfaces a thin film of liquid extends around the edge of the drops. It has been demonstrated that when two drops are close enough, a vapour gradient is created, causing a local increase of humidity and reducing the water evaporation of the thin film at the edge of the droplet. In such conditions, the local surface energy between liquid and vapour causes a force that drives two drops towards each other causing merging [18]. On the contrary, the increased but controlled hydrophobicity obtained with the perfluoroalkyl coatings allows to reduce the spot-to-spot distance: in particular, using poly(DMA-NAS-MAPS-PFDA), the pitch can be scaled down to 160 µm (FIGS. 4b) and 140 µm (FIG. 4c) avoiding merging. Moreover, FIG. 4c demonstrates that there is no coalescence even if the spot diameter is bigger, if compared to the diameter of the spots of FIG. 4b (100 µm vs 70 µm), difference due to dimensions of the nozzle used in the spotting process (80 µm vs 50 µm). On the contrary, the hydrophilic surface provided by poly(DMA-NAS-MAPS), generates spots with a bigger mean diameter, in particular 120 µm and 100 µm when using a 80 µm or 50 µm nozzle respectively.

3.4 Genotyping of KRAS G12D Mutation

Figure 5A:
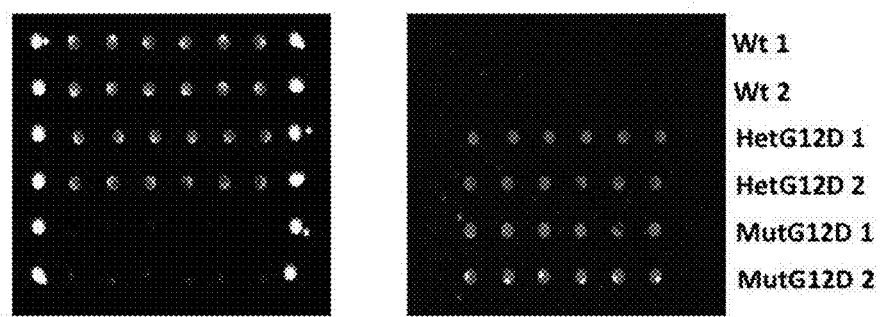
FIGS. 5A-B show microarray images for the genotyping of the G12D KRAS mutation on a silicon slide coated with poly(DMA-NAS-MAPS-PFDA). (A) Microarray scanning of the Cy3 fluorescence (green) corresponding to the wild type allele and Cy5 fluorescence (red) corresponding to the mutated allele. The white spots in the first and last column of the microarray represent amino-modified oligonucleotide labeled with Cy3 used as reference spots. (B) Normalized relative fluorescence intensity after hybridization of known control samples with the reporters complementary to the G12D variation. Bars are the average of the intensity of the six replicates of each sample. The error bars are the standard deviations of the fluorescence intensity of each sample. The arrays have been obtained using 80 μm nozzle; images were scanned using 90% of laser power and 80% of photomultiplier tube gain (PMT). Wt1 and Wt2: 2 different wild type control samples; HetG12D 1 and HetG12D 2: 2 different heterozygous control samples; MutG12D 1 and MutG12D 2: 2 different homozygous mutated control samples.
Figure 5B:
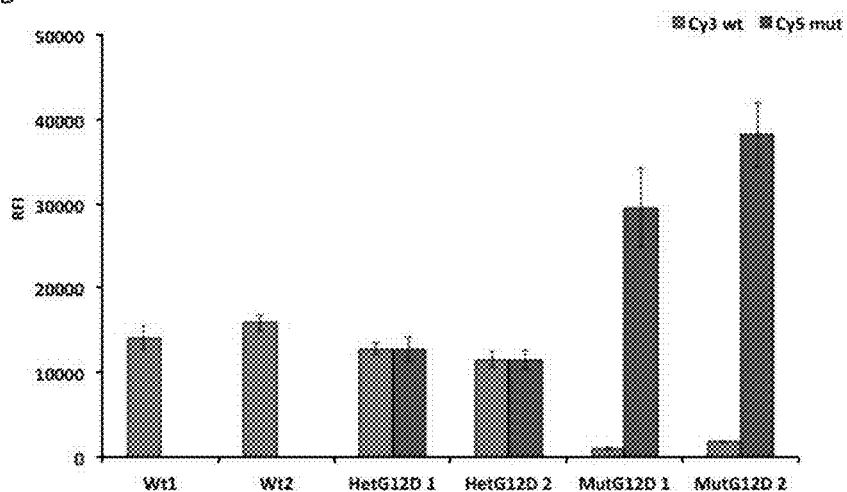

The oncogene KRAS is part of the signaling pathway of several different molecules. Gain-of-function missense mutations are often somatically acquired in colorectal cancer, prevalently at three hot spots represented by codons 12, 13, and 61. The potential of KRAS codon 12 mutations as effective molecular markers for drug selection has received considerable attention leading to their use in the routine care of patients with colorectal cancer [30]. In the work of Galbiati S. and collaborators, [15] a highly sensitive microarray for the detection of common KRAS mutations was developed. The optimized silicon slide system coated with the copolymer poly(DMA-NAS-MAPS) provided high fluorescence signals, good reproducibility and allowed correct identification of all genotypes. Similarly, as an example of the use of the poly(DMA-NAS-MAPS-PFDA) in a relevant clinical application based on DNA microarray, the genotyping of the KRAS G12D mutation was performed. Wild-type control samples and reconstituted heterozygous control samples (generated by properly mixing plasmidic DNA containing wild-type and mutated sequences of the KRAS G12D mutation) were used to test the assay specificity. Following optimized temperature and hybridization time, a correct identification of all genotypes was achieved. The example is illustrated in FIG. 5 where the hybridization experiment for the G12D KRAS mutation is shown. In this system, it was evident that: 1) fluorescent signals were high, 2) no or very small cross-hybridization was obtained, and 3) a good reproducibility from spot to spot (shown by error bars) was found.

Supplemental Information

To exemplify the binding capability of surfaces coated with the other two presented polymers, poly(DMA-NAS-MAPS-PFHA) and poly(DMA-NAS-MAPS-PFDDA), a 23-mer amino-modified oligonucleotide was immobilized on coated silicon/silicon oxide chips as reported in the Materials section (paragraph 2.7), using a piezoelectric spotter, mounting a 50 μm nozzle. Considering sucrose monolaurate gave the best results in terms of spot dimensions and homogeneity, it was used as additive also in these cases, while the others investigated surfactants were abandoned. As a comparison, a poly(DMA-NAS-MAPS-PFDA) coated slide was spotted using the same conditions, and the three surfaces have been analyzed after hybridization with a complementary oligonucleotide, labeled with a Cy3 dye. FIG. 6a shows the fluorescence images obtained on the three supports: homogeneous spots are obtained in all cases with a mean diameter of 70 μm, which is reduced with respect to the spots obtained, in the same conditions, onto the poly (DMA-NAS-MAPS) coated slides (average spot diameter 100 μm).

Furthermore, the uniformity of the spots and the low background signal lead to high fluorescence intensity signals, as shown in FIG. 6b. The length of the hydrophobic chain of the perfluoroalkyl monomers did not influence the performance of the coatings. As said, this is probably due to the fact that the fluorinated monomers differ from each other for just few carbons (see FIG. 1), which is probably not enough to change drastically the hydrophobicity of the coated surfaces.

The following working example data are taken from the priority provisional application (62/114,486 filed Feb. 10, 2015 and incorporated herein by reference including Figures).

1. Copoly(DMA-NAS-MAPS-perfluoroalkyl(meth)acrylate Synthesis

In a three-neck round bottom flask, 30 mL of anhydrous THF was degassed under vacuum for 20 minutes. DMA (4.8 g; 48.8 mmol; filtered over aluminum oxide to remove the inhibitor), NAS (0.176 g; 1.04 mmol), PFDA (0.8 g, 1.56 mmol) and AIBN (0.01 g; 0.08 mmol) were added under a nitrogen flow, and the stirred solution was degassed for an additional 10 minutes under vacuum. Subsequently, MAPS was added (0.129 g; 0.52 mmol) under a nitrogen flow, and the solution was polymerized at 65° C. for 2 hours. The reaction was stopped by cooling to room temperature. The polymer solution was diluted 1:1 with anhydrous THF and precipitated in 400 mL of petroleum ether. The product was collected as a white powder by filtration with a Buckner funnel and dried under vacuum at room temperature.

Polymer containing PFHA and PFDDA were synthesized as reported above, the chemical structure of the perfluoroalkyl monomers used is shown below. For example, several exemplary fluorinated monomers which impart to the surface low surface energy are described. They include, among others 1H,1H-perfluoroheptyl acrylate (PFHA), 1H,1H,2H,2H-perfluorodecyl acrylate (PFDA), 1H,1H,2H,2H perfluoro dodecyl acrylate (PFDDA).

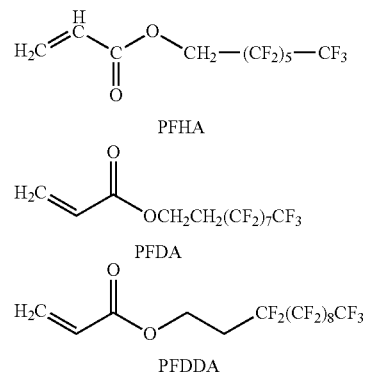

2 Coating of Microarray Slides and Glass Substrates with Copoly(DMA-NAS-MAPS-perfluoroalkyacrylate)

Copoly(DMA-NAS-MAPS-PFHA) or Copoly(DMA-NAS-MAPS-PFDA) or Copoly(DMA-NAS-MAPS-PFDDA) was dissolved in DI water to a final concentration of 0.7% w/v and in water containing $(NH_4)_2SO_4$ solution (40% of saturation, then diluted 6.6 times, final concentration 0.27 mM). The slides were immersed into the polymer solution for 30 minutes, rinsed in DI water, dried with nitrogen flow, and then cured at 80° C. under vacuum for 15 minutes. Before the immersion the slide was pre-treated with oxygen plasma in a Plasma Cleaner from Harrick Plasma (Ithaca, N.Y., USA). The oxygen pressure was set to 1.2 Bar with a power of 29.6 W for 10 min.

3 Goniometry

Water contact angle measurements, collected via the sessile drop method using a CAM200 instrument (KSV Ltd), which utilizes video capture and subsequent image analysis, indicate that copoly(DMA-NAS-MAPS-perfluoroalkyl acrylamide) coated surface is more hydrophobic than the copoly(DMA-MAPS-NAS). The contact angle values increase from about 40° to about 55°.

4 Functional Test of Microarray Slides

The oligonucleotides 5'-NH2-GCCCACCTATAAGG-TAAAAGTGA-3' (named COCU8) and 5'-GCCCAC-CTATAAGGTAAAAGTGA-3' (named COCU12) were dissolved in a 150 mM sodium phosphate buffer solution at pH 8.5 with a final concentration of 10 μM in the presence of various additives. The oligonucleotides were spotted using a SCENION sci-FLEXARRAYER S5 non-contact microarray spotter with a 50 μm nozzle. The spot volume, temperature, and humidity were precisely controlled to 200 μL, 22° C. and 65%, respectively. Four sub-arrays were created on each coated slide and the spot to spot center distance was varied. An aqueous blocking solution containing 0.1 M TRIS/HCl buffer at pH of 9 and containing 50 mM ethanolamine was heated to 50° C. The slides were immersed for 30 minutes in this solution and kept at 50° C. before rinsing with DI water. A second solution containing 4× saline sodium citrate (SSC) buffer and 0.1% SDS (sodium dodecyl sulfate) was prepared and pre-heated to 50° C. The slides were immersed for 15 minutes and kept at 50° C. before rinsing with DI water and drying with a nitrogen flow.

Hybridization. The spotted and blocked slides were incubated with a complementary oligonucleotide target, 5'-Cy3-TCACTTTTACCTTATAGGTGGGC-3', (COCU10) labeled with cyanine 3 for fluorescence detection. COCU10 was dissolved in water solution containing 2×SSC, 0.1% SDS and 0.2 mg/ml of BSA with a final concentration of 1 μM. Next, 25 μl of this solution were deposited on the array, and a coverslip was used to cover the hybridizing area. The hybridization reaction was conducted in an humid chamber at 65° C. for 2 hours. Finally, any unbounded oligonucleotides were removed using two 5 minute washes with an aqueous 4×SSC solution pre-heated to 65° C., a 1 minute wash with 0.2×SSC, and a 1 minute wash with 0.1×SSC followed by centrifugation to dry the slides. Images of each slide were obtained using the ScanArray Lite confocal laser scanner by Perkin Elmer and analyzed using ScanArray Express software.

On the slide reported in FIG. 1 of the priority provisional 62/114,486, four subarrays of CoCU8 were spotted with a pitch configuration of 200, 180, 160 and 140 um. COCU 8 was spotted at a 10 uM concentration in each subarray and hybridized with the complementary COCU 10, 1 uM, labeled with Cynine 3 dye. The spots do not merge at any of the pitch configurations used in this experiment.

Figure 2:
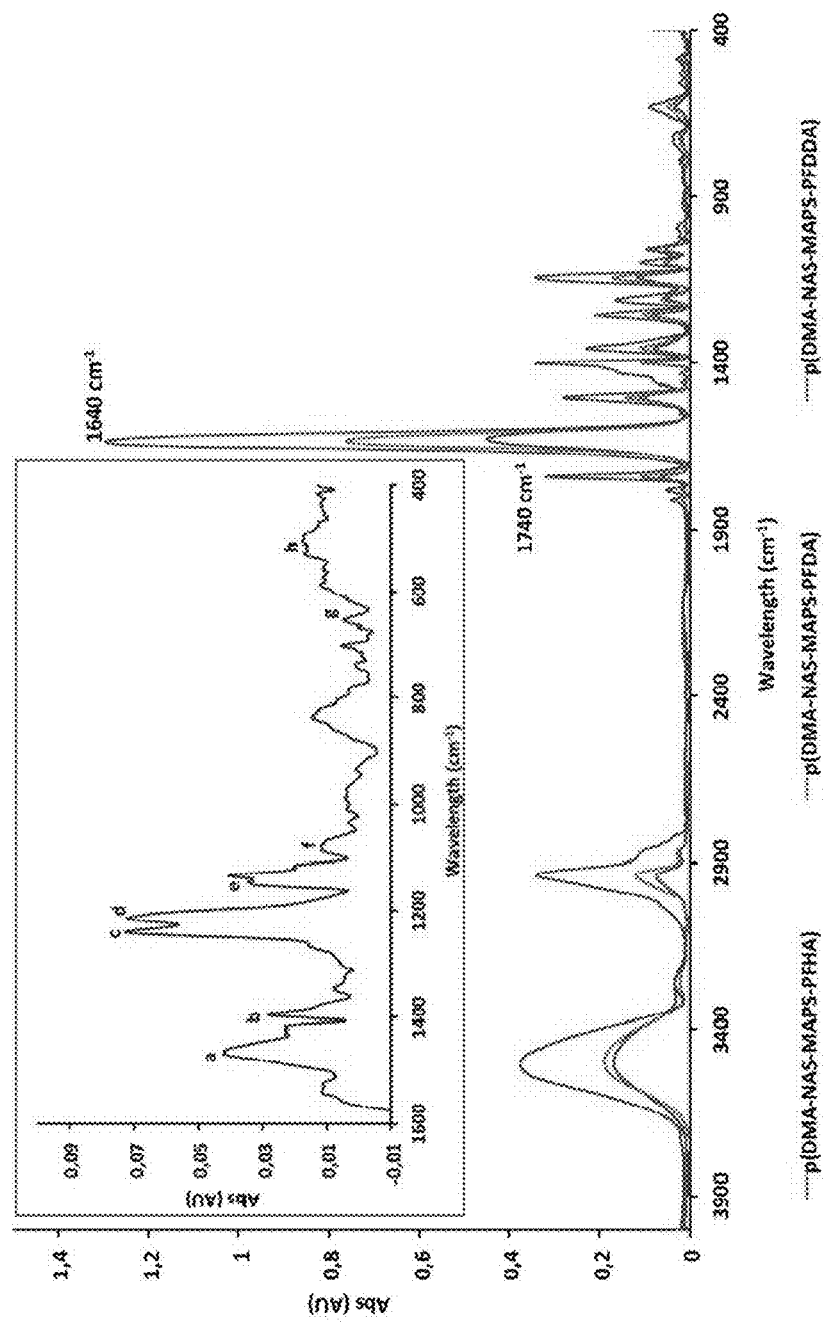
FIG. 2 shows FT-IR spectra of poly(DMA-NAS-MAPS-PFHA), poly(DMA-NAS-MAPS-PFDA) and poly(DMA-NAS-MAPS-PFDDA) registered using a Jasco 660 spectrophotometer. A total of 32 scans were recorded over the range 4000-400 $cm^{-1}$ at a resolution of 4 $cm^{-1}$ at intervals of 1 $cm^{-1}$. In the magnification area signals of perfluoroalkylacrylate monomers are highlighted.

For comparison, when the same experiment was performed on the copolymer lacking the hydrophobic perfluoroalky monomer, in similar conditions, the spots started to merge already at a pitch of 200 um and merged completely when the distance was 160 um as shown in FIG. 2 of priority provisional 62/114,486.

In a separate experiment (FIG. 3 of priority provisional 62/114,486), the spot size and morphology as a function of detergents added to the spotting buffer on a surface coated with copoly(DMA-NAS-MAPS-PFDA) was investigated. The experiment was identical to the one reported above with the only exception that different additives were present in the spotting buffer and the pitch was 200 uM. The composition of the spotting buffer affected the contact angle and the adhesivity of the liquid to the surface thus allowing to modulate spot size and array precision.

The diameter of the spots in the different conditions and the fluorescence intensity of the hybridized oligonucleotide of FIG. 3 are summarized in FIG. 4 of priority provisional 62/114,486. For some of the detergent used, the diameters are significantly lower than those provided by the parent polymer that doesn't have the hydrophobic monomer.

In the Priority Provisional Table P-1, below, the physical characteristics of surfaces coated with the copolymers containing different perfluoroalky monomers are summarized. Thickness, mass and density of the coated were measured by dual polarization interferometry with Analight Bio-200 (Far-field-UK).

TABLE P-1

| Monomer | Water Contact angle | Thickness (nm) | Mass (ng/mm$^2$) | Density (g/cm$^3$) |
|---|---|---|---|---|
| 1H,1H,perfluoro heptyl acrylate (PFHA) | 53.50 ± 1.4 | 8.488 | 0.878 | 0.103 |
| 1H,1H,2H,2H-perfluorodecyl acrylate (PFDA) | 55.57 ± 0.9 | 6.065 | 1.400 | 0.231 |
| 1H,1H,2H,2H perfluoro dodecyl acrylate (PFDDA) | 54.40 ± 2.83 | 5.784 | 1.035 | 0.179 |

CITED REFERENCES 1-30

[1] H. Y. Kim, S. E. Lee, M. J. Kim, J. Il Han, B. K. Kim, Y. S. Lee, et al., Characterization and simulation of cDNA microarray spots using a novel mathematical model., *BMC Bioinformatics*. 8 (2007) 485.

[2] J. M. Moran-Mirabal, C. P. Tan, R. N. Orth, E. O. Williams, H. G. Craighead, D. M. Lin, Controlling microarray spot morphology with polymer liftoff arrays, *Anal. Chem.* 79 (2007) 1109-1114.

[3] M. Lee, K. H. Kim, J. G. Park, J. H. Lee, H. W. Lim, M. Y. Park, et al., Fabrication of a hydrophobic/hydrophilic hybrid-patterned microarray chip and its application to a cancer marker immunoassay, *Biochip J.* 6 (2012) 10-16.

[4] W. Senaratne, L. Andruzzi, C. K. Ober, Self-assembled monolayers and polymer brushes in biotechnology: current applications and future perspectives., *Biomacromolecules*. 6 (2005) 2427-2448.

[5] L. Sola, M. Cretich, F. Damin, M. Chiari, Surface modifications by polymers for biomolecule conjugation, *Methods Mol. Biol.* 1025 (2013) 95-107.

[6] G. C. Le Goff, L. J. Blum, C. A. Marquette, Shrinking hydrogel-DNA spots generates 3D microdots arrays., *Macromol. Biosci.* 13 (2013) 227-33. doi:10.1002/mabi.201200370.

[7] G. Pirri, F. Damin, M. Chiari, E. Bontempi, L. E. Depero, Characterization of A Polymeric Adsorbed Coating for DNA Microarray Glass Slides, *Anal. Chem.* 76 (2004) 1352-1358.

[8] M. Cretich, M. R. Monroe, A. Reddington, X. Zhang, G. G. Daaboul, F. Damin, et al., Interferometric silicon biochips for label and label-free DNA and protein microarrays, *Proteomics*. 12 (2012) 2963-2977.

[9] M. Cretich, M. Bagnati, F. Damin, L. Sola, M. Chiari, Overcoming mass transport limitations to achieve femtomolar detection limits on silicon protein microarrays, *Anal. Biochem.* 418 (2011) 164-166.

[10] M. Cretich, V. Sedini, F. Damin, M. Pelliccia, L. Sola, M. Chiari, Coating of nitrocellulose for colorimetric DNA microarrays, *Anal. Biochem.* 397 (2010) 84-88.

[11] D. Petti, a. Torti, F. Damin, L. Sola, M. Rusnati, E. Albisetti, et al., Functionalization of gold surfaces with copoly(DMA-NAS-MAPS) by dip coating: Surface characterization and hybridization tests, *Sensors Actuators, B Chem.* 190 (2014) 234-242.

[12] C. Zilio, L. Sola, F. Damin, L. Faggioni, M. Chiari, Universal hydrophilic coating of thermoplastic polymers currently used in microfluidics, *Biomed Microdevices*. 16 (2014) 107-114.

[13] M. Mammen, G. Dahmann, G. M. Whitesides, Effective Inhibitors of Hemagglutination by Influenza Virus Synthesized from Polymers Having Active Ester Groups. Insight into Mechanism of Inhibition, *J. Med. Chem.* 38 (1995) 4179-4190.

[14] S. Stenirri, I. Fermo, S. Battistella, S. Galbiati, N. Soriani, R. Paroni, et al., Denaturing HPLC profiling of the ABCA4 gene for reliable detection of allelic variations., Clin. Chem. 50 (2004) 1336-43.

[15] S. Galbiati, F. Damin, P. Pinzani, I. Mancini, S. Vinci, M. Chiari, et al., A new microarray substrate for ultra-sensitive genotyping of KRAS and BRAF gene variants in colorectal cancer., PLoS One. 8 (2013) e59939.

[16] M. Meli, M. Gasset, G. Colombo, Dynamic diagnosis of familial prion diseases supports the β2-α2 loop as a universal interference target., PLoS One. 6 (2011) e19093.

[17] S. Galbiati, F. Damin, G. Di Carlo, M. Ferrari, L. Cremonesi, M. Chiari, Development of new substrates for high-sensitive genotyping of minority mutated alleles, Electrophoresis. 29 (2008) 4714-4722.

[18] N. J. Cira, a Benusiglio, M. Prakash, Vapour-mediated sensing and motility in two-component droplets, Nature. 519 (2015) 446-450.

[19] M. Hartmann, J. Roeraade, D. Stoll, M. F. Templin, T. O. Joos, Protein microarrays for diagnostic assays, Anal. Bioanal. Chem. 393 (2009) 1407-1416.

[20] S. L. Lai, C.-H. Chen, K.-L. Yang, Enhancing the fluorescence intensity of DNA microarrays by using cationic surfactants., Langmuir. 27 (2011) 5659-64.

[21] D. S. Rickman, C. J. Herbert, L. P. Aggerbeck, Optimizing spotting solutions for increased reproducibility of cDNA microarrays., Nucleic Acids Res. 31 (2003) e109.

[22] R. P. Auburn, D. P. Kreil, L. A. Meadows, B. Fischer, S. S. Matilla, S. Russell, Robotic spotting of cDNA and oligonucleotide microarrays, Trends Biotechnol. 23 (2005) 374-379.

[23] V. Kumar, J. Pulpytel, F. Arefi-Khonsari, Fluorocarbon coatings via plasma enhanced chemical vapor deposition of 1H,1H,2H,2H-perfluorodecyl acrylate-1, spectroscopic characterization by FT-IR and XPS, Plasma Process. Polym. 7 (2010) 939-950.

[24] G. H. Cross, A. A. Reeves, S. Brand, J. F. Popplewell, L. L. Peel, M. J. Swann, et al., A new quantitative optical biosensor for protein characterisation, Biosens. Bioelectron. 19 (2003) 383-390.

[25] M. J. Swann, L. L. Peel, S. Carrington, N. J. Freeman, Dual-polarization interferometry: an analytical technique to measure changes in protein structure in real time, to determine the stoichiometry of binding events, and to differentiate between specific and nonspecific interactions., Anal. Biochem. 329 (2004) 190-8.

[26] R. Suriano, M. Levi, G. Pirri, F. Damin, M. Chiari, S. Turri, Surface behavior and molecular recognition in DNA microarrays from N,N-dimethylacrylamide terpolymers with activated esters as linking groups, Macromol. Biosci. 6 (2006) 719-29.

[27] M. Cretich, C. Di Carlo, R. Longhi, C. Ciotti, N. Spinella, S. Coffa, et al.,. High sensitivity protein assays on microarray silicon slides, Anal. Chem. 81 (2009) 5197-5203.

[28] M. Cretich D, Breda, F. Damin, M. Borghi, L. Sola, S. M. Unlu, et al., Allergen microarrays on high-sensitivity silicon slides, Anal. Bioanal. Chem. 398 (2010) 1723-33.

[29] S. Battistella, F. Damin, Chiari, K. Delgrosso, S. Surrrey, P. Fortina, et al., Genotyping ??-globin gene mutations on copolymer-coated glass slides with the ligation detection reaction, Clin. Chem. 54 (2008) 1657-1663.

[30] C. C. Pritchard, W. M. Grady, Colorectal cancer molecular biology moves into clinical practice. Gut. 60 (2011) 116-129.

TABLE 1

Quantities of reagents used for the synthesis of poly(DMA-NAS-MAPS-PFHA), poly(DMA-NAS-MAPS-PFDA) and poly(DMA-NAS-MAPS-PFDDA)

| Reagent | mmol | g | V (mL) |
|---|---|---|---|
| p(DMA-NAS-MAPS-PFHA) | | | |
| DMA | 34.00 | 3.37 | 3.50 |
| PFHA | 1.08 | 0.42 | 0.27 |
| NAS | 0.66 | 0.11 | |
| MAPS | 0.36 | 0.09 | 0.08 |
| p(DMA-NAS-MAPS-PFDA) | | | |
| DMA | 33.00 | 3.27 | 3.40 |
| PFDA | 1.04 | 0.54 | 0.33 |
| NAS | 0.71 | 0.12 | |
| MAPS | 0.34 | 0.08 | 0.08 |
| p(DMA-NAS-MAPS-PFDDA) | | | |
| DMA | 31.97 | 3.17 | 3.29 |
| PFDDA | 1.02 | 0.63 | |
| NAS | 0.68 | 0.12 | |
| MAPS | 0.34 | 0.08 | 0.08 |

TABLE 2

Contact angles of the coated surfaces obtained using pure water and solutions containing 0.01% of surfactants.

| Polymer | Contact Angle | | | | | | |
|---|---|---|---|---|---|---|---|
| | Water | Betaine | Brij | Sucrose monolaurate | Sulfobetaine | Tween 20 | Triton |
| poly (DMA-NAS-MAPS) | 32.96 ± 1.00 | 26.74 ± 1.05 | 6.32 ± 3.41 | 19.94 ± 2.54 | 19.7 ± 1.67 | 13.75 ± 3.62 | 3.3 ± 0.58 |
| poly (DMA-NAS-MAPS-PFHA) | 53.94 ± 1.21 | 58.42 ± 0.73 | 42.91 ± 7.53 | 40.59 ± 5.48 | 44.1 ± 1.47 | 40.33 ± 5.60 | 25.5 ± 2.43 |
| poly (DMA-NAS-MAPS-PFDA) | 55.39 ± 1.83 | 53.98 ± 1.32 | 30.43 ± 2.03 | 37.71 ± 6.7 | 55.02 ± 1.82 | 38.29 ± 7.72 | 25.56 ± 2.16 |

TABLE 2-continued

Contact angles of the coated surfaces obtained using pure water and solutions containing 0.01% of surfactants.

| Polymer | Contact Angle | | | | | | |
|---|---|---|---|---|---|---|---|
| | Water | Betaine | Brij | Sucrose monolaurate | Sulfobetaine | Tween 20 | Triton |
| poly (DMA-NAS-MAPS-PFDDA) | 53.03 ± 1.91 | 53.31 ± 1.14 | 42.23 ± 5.57 | 33.32 ± 0.45 | 46.71 ± 4.37 | 45.3 ± 3.72 | 29.09 ± 1.21 |

TABLE 3

Surface energy values calculated using pure DI water on the coated surfaces

| Polymer | Surface energy (mN/m) |
|---|---|
| poly (DMA-NAS-MAPS) | 114.37 ± 19.19 |
| poly (DMA-NAS-MAPS-PFHA) | 56.81 ± 1.73 |
| poly (DMA-NAS-MAPS-PFDA) | 43.68 ± 4.54 |
| poly (DMA-NAS-MAPS-PFDDA) | 57.7 ± 5.1 |

TABLE 4

Refractive index, mass, thickness and density of the polymeric films obtained using DPI.

| Polymer | Refractive index | Thickness (nm) | Mass (ng/mm$^2$) | Density (g/cm$^3$) |
|---|---|---|---|---|
| poly(DMA-NAS-MAPS-PFHA) | 1.35 ± 0.01 | 8.22 ± 2.27 | 0.81 ± 0.06 | 0.10 ± 0.03 |
| poly(DMA-NAS-MAPS-PFDA) | 1.36 ± 0.01 | 6.58 ± 2.18 | 1.17 ± 0.16 | 0.20 ± 0.06 |
| poly(DMA-NAS-MAPS-PFDDA) | 1.36 ± 0.01 | 5.18 ± 0.69 | 0.89 ± 0.10 | 0.17 ± 0.03 |

CONCLUDING REMARKS

Described herein, for preferred embodiments, is a novel polymeric coating for DNA microarrays with precisely controlled hydrophobic/hydrophilic characteristics, useful for the fabrication of dense microarray with small spot pitch. In particular, the polymer backbone, made of DMA, has been adapted to include perfluoroalkylacrylate monomers in small molar fraction in order to moderately increase the hydrophobicity of the surface, but maintaining the advantages of the already introduced poly(DMA-NAS-MAPS) in terms of simplicity of synthesis and coating production, high probe binding density, tri-dimensionality and low background signal. The perfluoroalkylacrylate copolymers generate low-energy surfaces, stabilizing the spots onto the functionalized chips and controlling their spreading, enabling a reduction of spot distance without their coalescence. Furthermore, the use of several surfactants to ameliorate spot morphology has been investigated, which is known to have a deep impact on fluorescence signal. The combination of a modulated hydrophobicity due to the presence of perfluoroalkylacrylate monomers along the polymer chain and sucrose monolaurate as additive in the spotting buffer, allows the fabrication of a denser array with reduced distance between spots, regular spot morphology with appreciable homogeneity and very high signal-to-noise ratio.

Finally, it has been demonstrated that the proposed hydrophobic surfaces are suitable for DNA microarrays, in particular, for the genotyping of KRAS G12D mutation.

What is claimed is:

1. A copolymer consisting of:
   a backbone consisting of N-substituted acrylamide, N-substituted methacrylamide, acrylate, or methacrylate repeat units,
   wherein the copolymer consists of at least four repeat units different from each other, wherein (A) at least one of the repeat units is a surface interacting monomer repeat unit, (B) at least one of the repeat units is adapted for covalently binding to a biological molecule, (C) at least one repeat units is a silane repeat unit, and (D) at least one repeat units is a fluorinated monomer repeat unit.

2. The copolymer of claim 1, wherein the fluorinated monomer repeat unit D is an acrylate or an N-substituted acrylamide repeat unit.

3. The copolymer of claim 1, wherein the fluorinated monomer repeat unit D is represented by:

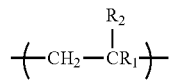

wherein $R_1$ is H or —$CH_3$, and $R_2$ is —C(O)O—$R_3$ or —C(O)NH—$R_3$, wherein $R_3$ is a monovalent $C_1$-$C_{15}$ fluorinated group having a terminal $CF_3$ group and at least one —$CF_2$— group.

4. The copolymer of claim 1, wherein the fluorinated monomer repeat unit D is represented by:

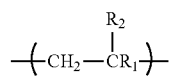

wherein $R_1$ is H or —$CH_3$, and $R_2$ is —C(O)O—$R_3$ or —C(O)NH—$R_3$, wherein $R_3$ a monovalent $C_1$-$C_{15}$ fluorinated group having a terminal $CF_3$ group and at least five —$CF_2$— groups.

5. The copolymer of claim 1, wherein the fluorinated monomer repeat unit D is represented by:

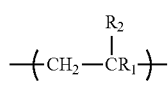

wherein $R_1$ is H, and $R_2$ is —C(O)O—$R_3$, wherein $R_3$ a monovalent $C_6$-$C_{15}$ is fluorinated group having a terminal $CF_3$ group and at least five —$CF_2$— groups and at least one —$CH_2$— group.

6. The copolymer of claim 1, wherein the silane monomer repeat unit C is represented by:

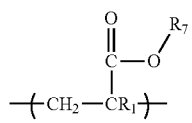

wherein $R_1$ is H or methyl and $R_7$ comprises a silane moiety, and wherein the surface interacting monomer repeat unit A is represented by:

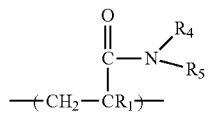

wherein $R_1$ is H or methyl, and $R_4$ and $R_5$ are independently optionally subsituted alkyl groups, and wherein for the monomer repeat unit bearing a chemically active group, B, the chemically active group is selected from the group of thiols, primary amines, secondary amines, tertiary amines, quaternary ammoniums, phosphines, alcohols, carboxylic acids, vinylsulfonyls, aldehydes, epoxides, hydrazides, succinimidyl esters, carbodiimides, maleimides, iodoacetyls, isocyanates, isothiocyanates, aziridines, sulfonates or halides.

7. The copolymer of claim 1, wherein the molar amounts of the monomer repeat units are:
A) for monomer repeat unit A, 65% to 99%;
B) for monomer repeat unit B, 0.1% to 10%;
D) for monomer repeat unit D, 0.1% to 10%.

8. A composition comprising the copolymer of claim 1, wherein the copolymer is a soluble, uncrosslinked copolymer, and at least one solvent for the copolymer.

9. The composition of claim 8, wherein the solvent is water and the composition further comprises at least one salt.

10. A device comprising the copolymer of claim 1.

11. The device of claim 10, wherein the device is a microarray device in which the copolymer is disposed as a film on a substrate and the film has a thickness of 1 nm to 100 nm.

12. A method comprising binding the copolymer of the device of claim 10 to a biomolecule.

13. The method according to claim 12, wherein the device is a microarray characterized by a spot size pitch of less than 200 microns.

14. A method for making the copolymer of claim 1 comprising copolymerizing:
 i) at least one monomer A' to provide monomer repeat unit A in the copolymer;
 ii) at least one monomer B' to provide monomer repeat unit B in the copolymer;
 iii) at least one monomer C' to provide monomer repeat unit C in the copolymer; and
 iv) at least one monomer D' to provide monomer repeat unit D in the copolymer.

15. The copolymer of claim 1, wherein the molar amount of the monomer repeat unit A is over 50%.

16. The copolymer of claim 1, wherein the molar amounts of the monomer repeat units are:
A) for monomer repeat unit A, 90% to 99%;
B) for monomer repeat unit B, 1% to 5%;
D) for monomer repeat unit D, 1% to 10%.

17. The copolymer of claim 1, wherein:
 the surface interacting monomer repeat unit A is an N-substituted acrylamide repeat unit or an N-substituted methacrylamide repeat unit,
 the monomer repeat unit B bearing a chemically active group B, the chemically active group is a succinimidyl ester,
 the silane monomer repeat unit C is present and is selected from the group of a polymerized form of a monomer which is an alkoxy silane monomer or an acyloxy silane monomer, and
 the fluorinated monomer repeat unit D is an acrylate.

* * * * *